(12) United States Patent
Maeda

(10) Patent No.: US 12,542,068 B2
(45) Date of Patent: Feb. 3, 2026

(54) MULTIFUNCTION PERIPHERAL, SERVER, AND SYSTEM

(71) Applicant: Canon Kabushiki Kaisha, Tokyo (JP)

(72) Inventor: Masao Maeda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 681 days.

(21) Appl. No.: 17/974,757

(22) Filed: Oct. 27, 2022

(65) Prior Publication Data

US 2023/0145814 A1 May 11, 2023

(30) Foreign Application Priority Data

Nov. 8, 2021 (JP) .................................. 2021-182057

(51) Int. Cl.
G09B 7/06 (2006.01)

(52) U.S. Cl.
CPC ..................................... G09B 7/06 (2013.01)

(58) Field of Classification Search
CPC ... G09B 7/06; G09B 7/02; G09B 7/00; G09B 3/02; H04N 2201/0094
See application file for complete search history.

(56) References Cited

U.S. PATENT DOCUMENTS

2021/0281697 A1\* 9/2021 Suzuki ............... H04N 1/00816

FOREIGN PATENT DOCUMENTS

JP 2017-156548 A 9/2017

\* cited by examiner

*Primary Examiner* — Jerry-Daryl Fletcher
(74) *Attorney, Agent, or Firm* — Venable LLP

(57) ABSTRACT

A multifunction peripheral comprises a reading unit configured to read a filled-in answer sheet on which an answer has been filled in, a transmitting unit configured to transmit, to a server, data related to the filled-in answer sheet read by the reading unit, a receiving unit configured to receive, from a server, data related to a correctness of the answer that has been filled in on the filled-in answer sheet and a printing unit configured to execute, based on the data related to the correctness of the answer that has been received by the receiving unit, first print processing for printing a scoring result of the answer.

16 Claims, 27 Drawing Sheets

FIG. 7

ACADEMIC APTITUDE
CONFIRMATION TEST MATH (UNIT 3)

SCHOOL YEAR  CLASS  NAME  PERFORMED DATE MONTH DATE  POINTS

SECTION 1

| 1 | Ⓐ Ⓑ Ⓒ Ⓓ Ⓔ | 2 | Ⓐ Ⓑ Ⓒ Ⓓ Ⓔ | 3 | Ⓐ Ⓑ Ⓒ Ⓓ Ⓔ | 4 | Ⓐ Ⓑ Ⓒ Ⓓ Ⓔ |
|---|---|---|---|---|---|---|---|
| 5 | Ⓐ Ⓑ Ⓒ Ⓓ Ⓔ | 6 | Ⓐ Ⓑ Ⓒ Ⓓ Ⓔ | 7 | Ⓐ Ⓑ Ⓒ Ⓓ Ⓔ | 8 | Ⓐ Ⓑ Ⓒ Ⓓ Ⓔ |
| 9 | Ⓐ Ⓑ Ⓒ Ⓓ Ⓔ | 10 | Ⓐ Ⓑ Ⓒ Ⓓ Ⓔ | 11 | Ⓐ Ⓑ Ⓒ Ⓓ Ⓔ | 12 | Ⓐ Ⓑ Ⓒ Ⓓ Ⓔ |
| 13 | Ⓐ Ⓑ Ⓒ Ⓓ Ⓔ | 14 | Ⓐ Ⓑ Ⓒ Ⓓ Ⓔ | 15 | Ⓐ Ⓑ Ⓒ Ⓓ Ⓔ | 16 | Ⓐ Ⓑ Ⓒ Ⓓ Ⓔ |

POINTS

SECTION 2

| 1 | | 2 | | 3 | | | |
|---|---|---|---|---|---|---|---|
| 4 | | 5 | | 6 | | 7 | |
| 8 | | | | | | | |
| 9 | | | | | | 10 | |

POINTS

SECTION 3

POINTS

FIG. 8

| | | | | |
|---|---|---|---|---|
| ACADEMIC APTITUDE CONFIRMATION TEST MATH (UNIT 3) | | | | |
| 3 SCHOOL YEAR  2 CLASS | NAME TARO YAMADA | PERFORMED DATE 5 MONTH  13 DATE | | POINTS |

SECTION 1

| 1 | Ⓐ●ⒸⒹⒺ | 2 | ⒶⒷ●ⒹⒺ | 3 | ⒶⒷ●ⒹⒺ | 4 | ●ⒷⒸⒹⒺ |
|---|---|---|---|---|---|---|---|
| 5 | ⒶⒷⒸ●Ⓔ | 6 | ⒶⒷ●ⒹⒺ | 7 | ⒶⒷⒸ●Ⓔ | 8 | Ⓐ●ⒸⒹⒺ |
| 9 | ●ⒷⒸⒹⒺ | 10 | ⒶⒷⒸ●Ⓔ | 11 | Ⓐ●ⒸⒹⒺ | 12 | ⒶⒷⒸⒹ● |
| 13 | ⒶⒷⒸⒹ● | 14 | Ⓐ●ⒸⒹⒺ | 15 | ●ⒷⒸⒹⒺ | 16 | ⒶⒷⒸ●Ⓔ |

POINTS

SECTION 2

| 1 | 3 | 2 | 50 | 3 | RECTANGLE | | |
|---|---|---|---|---|---|---|---|
| 4 | 25 | 5 | 90° | 6 | POINT A | 7 | ANGLE B |
| 8 | SEGMENT AB AND SEGMENT CD ARE PARALLEL | | | | | | |
| 9 | AREA OF QUADRILATERAL ABDD | | | | | 10 | |

POINTS

SECTION 3

$x + y = 20$ —— ①  WHEN RESPECTIVE SIDES OF
$2x - y = 7$ —— ②  ① AND ② ARE ADDED,
$3x = 27$
$x = 9$
WHEN SUBSTITUTED INTO ①
$9 + y = 27$
$y = 11$   ANSWER  $x = 9, y = 11$

POINTS

FIG. 9

ACADEMIC APTITUDE CONFIRMATION TEST MATH (UNIT 3)

| 3 SCHOOL YEAR | 2 CLASS | NAME TARO YAMADA | PERFORMED DATE 5 MONTH 13 DATE | 83 POINTS |

SECTION 1

| 1 A●CDE | 2 AB●DE | 3 AB●DE | 4 ●BCDE |
| 5 AB●●E | 6 AB●DE | 7 ABCD● | 8 A●CDE |
| 9 ●BCDE | 10 ABC●E | 11 A●CDE | 12 A●CDE |
| 13 ABCD● | 14 A●CDE | 15 ●BCDE | 16 ABC●E |

26 POINTS

SECTION 2

| 1 ③ | 2 ㊿ | ③ RECTANGLE | |
| 4 ㉕ | 5 ⑨⓪° | ⑥ POINT A | 7 ANGLE B ✗ |
| 8 SEGMENT AB AND SEGMENT CD ARE PARALLEL ✗ |
| ⑨ AREA OF QUADRILATERAL ABDD | 10 ✗ |

17 POINTS

SECTION 3

$x + y = 20$ ——① WHEN RESPECTIVE SIDES OF
$2x - y = 7$ ——② ① AND ② ARE ADDED,
$3x = 27$
$x = 9$
WHEN SUBSTITUTED INTO ①
$9 + y = 27$
$y = 11$  ANSWER $x = 9, y = 11$

40 POINTS

FIG. 10A

| | | |
|---|---|---|
| REQUEST LINE | GET base + /getanswersheet HTTP/1.1 | |
| REQUEST HEADER | | |
| | NAME | DESCRIPTION |
| | printerid | CHARACTER STRING IDENTIFYING PRINTER |
| | subject | CHARACTER STRING SPECIFYING SUBJECT OF ANSWER SHEET TO BE OBTAINED |
| | unit | CHARACTER STRING SPECIFYING UNIT OF ANSWER SHEET TO BE OBTAINED |
| | (BLANK LINE) | |
| MESSAGE BODY | NONE | |

FIG. 10B

| | | |
|---|---|---|
| STATUS LINE | HTTP/1.1 200 OK | |
| STATUS HEADER | | |
| | NAME | DESCRIPTION |
| | printerid | CHARACTER STRING IDENTIFYING PRINTER |
| | subject | CHARACTER STRING SPECIFYING SUBJECT OF ANSWER SHEET TO BE OBTAINED |
| | unit | CHARACTER STRING SPECIFYING UNIT OF ANSWER SHEET TO BE OBTAINED |
| | (BLANK LINE) | |
| MESSAGE BODY | | |
| | NAME | DESCRIPTION |
| | answersheet | IMAGE DATA OF ANSWER SHEET |

FIG. 11A

| | | |
|---|---|---|
| 5001 | REQUEST LINE | GET base + /getsubjectlist HTTP/1.1 |
| 5002 | REQUEST HEADER | |
| | NAME | DESCRIPTION |
| | printerid | CHARACTER STRING IDENTIFYING PRINTER — 5104 |
| | (BLANK LINE) | |
| 5003 | MESSAGE BODY | NONE |

| | | |
|---|---|---|
| 5011 | STATUS LINE | HTTP/1.1 200 OK |
| 5012 | STATUS HEADER | |
| | NAME | DESCRIPTION |
| | printerid | CHARACTER STRING IDENTIFYING PRINTER — 5114 |
| | (BLANK LINE) | |
| 5013 | MESSAGE BODY | |
| | NAME | DESCRIPTION |
| | subjectlist | LIST OF SUBJECT CHARACTER STRINGS — 5115 |

| | | |
|---|---|---|
| 5001 — REQUEST LINE | GET base + /getunitlist HTTP/1.1 | |
| 5002 — REQUEST HEADER | | |
| | NAME | DESCRIPTION |
| | printerid | CHARACTER STRING IDENTIFYING PRINTER — 5204 |
| | subject | CHARACTER STRINGS FOR SPECIFYING SUBJECT OF LIST OF UNITS TO BE OBTAINED — 5205 |
| | (BLANK LINE) | |
| 5003 — MESSAGE BODY | NONE | |

| | | |
|---|---|---|
| 5011 — STATUS LINE | HTTP/1.1  200 OK | |
| 5012 — STATUS HEADER | | |
| | NAME | DESCRIPTION |
| | printerid | CHARACTER STRING IDENTIFYING PRINTER — 5214 |
| | subject | CHARACTER STRINGS FOR SPECIFYING SUBJECT OF LIST OF UNITS TO BE OBTAINED — 5215 |
| | (BLANK LINE) | |
| 5013 — MESSAGE BODY | | |
| | NAME | DESCRIPTION |
| | unitlist | LIST OF UNIT CHARACTER STRINGS — 5216 |

F I G. 13A

5000d

| | | |
|---|---|---|
| REQUEST LINE | POST base + /requestscoring HTTP/1.1 | |
| REQUEST HEADER | | |
| NAME | DESCRIPTION | |
| printerid | CHARACTER STRING IDENTIFYING PRINTER | ~5304 |
| subject | CHARACTER STRING SPECIFYING SUBJECT TO BE SCORED | ~5305 |
| unit | CHARACTER STRING SPECIFYING UNIT TO BE SCORED | ~5306 |
| (BLANK LINE) | | |
| MESSAGE BODY | NONE | |
| NAME | DESCRIPTION | |
| answersheet | ANSWER DATA GENERATED FROM FILLED-IN ANSWER SHEET | ~5307 |

- 5001 → REQUEST LINE
- 5002 → REQUEST HEADER
- 5003 → MESSAGE BODY

F I G. 13B

5010d

| | | |
|---|---|---|
| STATUS LINE | HTTP/1.1 200 OK | |
| STATUS HEADER | | |
| NAME | DESCRIPTION | |
| printerid | CHARACTER STRING IDENTIFYING PRINTER | ~5314 |
| subject | CHARACTER STRING SPECIFYING SUBJECT TO BE SCORED | ~5315 |
| unit | CHARACTER STRING SPECIFYING UNIT TO BE SCORED | ~5316 |
| status | CHARACTER STRING INDICATING SCORING STATE | ~5317 |
| token | TOKEN CHARACTER STRING FOR OBTAINING RESULT | ~5318 |
| (BLANK LINE) | | |
| MESSAGE BODY | NONE | |

- 5011 → STATUS LINE
- 5012 → STATUS HEADER
- 5013 → MESSAGE BODY

| | | |
|---|---|---|
| 5001 — REQUEST LINE | GET base + /getsroedsheet HTTP/1.1 | |
| 5002 — REQUEST HEADER | | |
| | NAME | DESCRIPTION |
| | printerid | CHARACTER STRING IDENTIFYING PRINTER ~5404 |
| | subject | CHARACTER STRING SPECIFYING SUBJECT OF ANSWER SHEET FOR WHICH SCORING RESULT IS TO BE OBTAINED ~5405 |
| | unit | CHARACTER STRING SPECIFYING UNIT OF ANSWER SHEET FOR WHICH SCORING RESULT IS TO BE OBTAINED ~5406 |
| | token | TOKEN CHARACTER STRING ~5407 |
| | (BLANK LINE) | |
| 5003 — MESSAGE BODY | NONE | |

| | | |
|---|---|---|
| 5011 — STATUS LINE | HTTP/1.1 200 OK | |
| 5012 — STATUS HEADER | | |
| | NAME | DESCRIPTION |
| | printerid | CHARACTER STRING IDENTIFYING PRINTER ~5414 |
| | subject | CHARACTER STRING SPECIFYING SUBJECT OF ANSWER SHEET FOR WHICH SCORING RESULT IS TO BE OBTAINED ~5415 |
| | unit | CHARACTER STRING SPECIFYING UNIT OF ANSWER SHEET FOR WHICH SCORING RESULT IS TO BE OBTAINED ~5416 |
| | token | TOKEN CHARACTER STRING ~5417 |
| | status | CHARACTER STRING INDICATING SCORING STATE ~5418 |
| | (BLANK LINE) | |
| 5013 — MESSAGE BODY | | |
| | NAME | DESCRIPTION |
| | answersheet | IMAGE DATA OF SCORED ANSWER SHEET ~5419 |

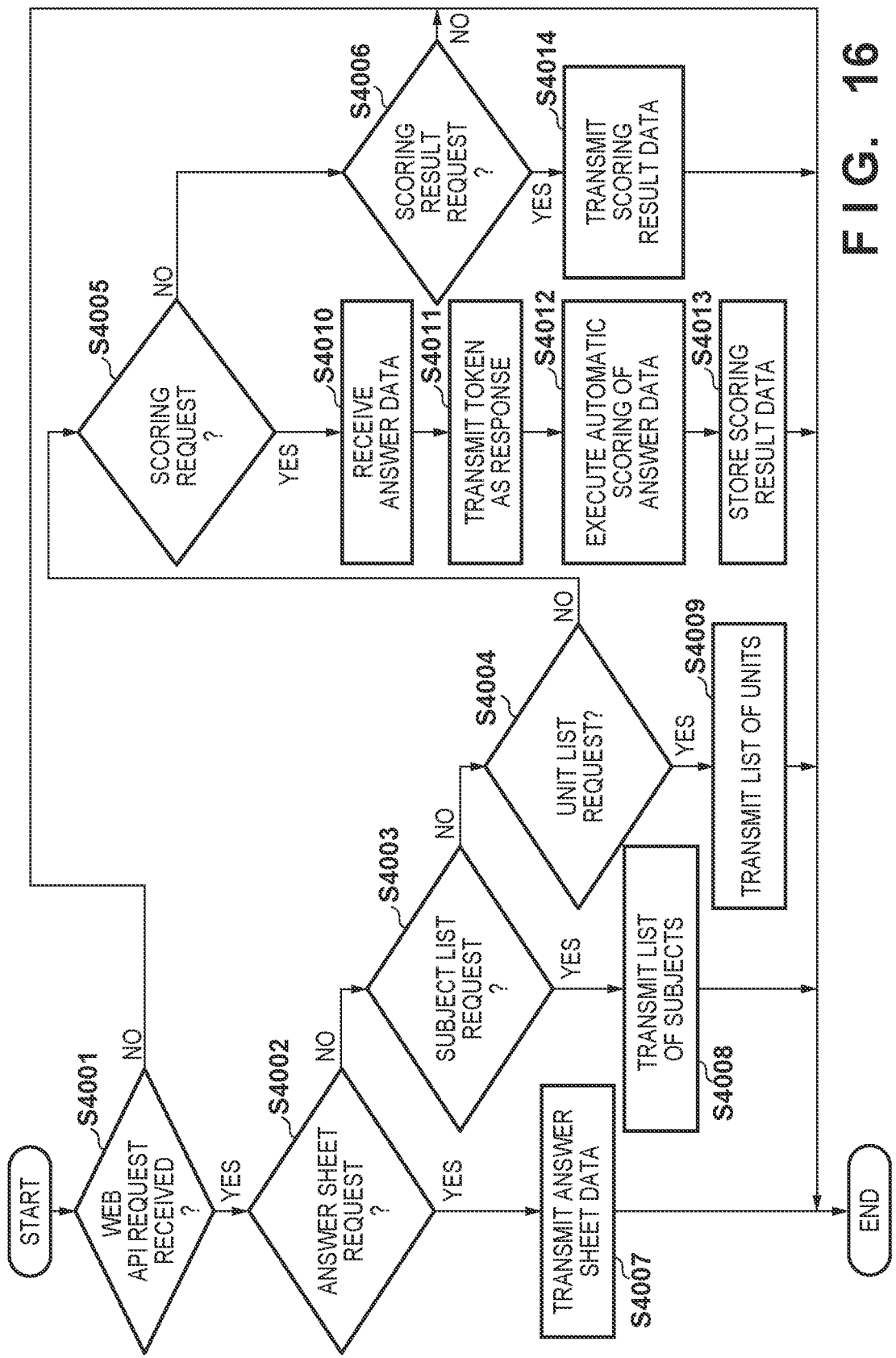
F I G. 16

| | | |
|---|---|---|
| 5001 — REQUEST LINE | GET base + /getsroedsheet HTTP/1.1 | |
| 5002 — REQUEST HEADER | | |
| | NAME | DESCRIPTION |
| | printerid | CHARACTER STRING IDENTIFYING PRINTER — 5404 |
| | subject | CHARACTER STRING SPECIFYING SUBJECT OF ANSWER SHEET FOR WHICH SCORING RESULT IS TO BE OBTAINED — 5405 |
| | unit | CHARACTER STRING SPECIFYING UNIT OF ANSWER SHEET FOR WHICH SCORING RESULT IS TO BE OBTAINED — 5406 |
| | token | TOKEN CHARACTER STRING — 5407 |
| | (BLANK LINE) | |
| 5003 — MESSAGE BODY | NONE | |

| | | |
|---|---|---|
| 5011 — STATUS LINE | HTTP/1.1 200 OK | |
| 5012 — STATUS HEADER | | |
| | NAME | DESCRIPTION |
| | printerid | CHARACTER STRING IDENTIFYING PRINTER — 5414 |
| | subject | CHARACTER STRING SPECIFYING SUBJECT OF ANSWER SHEET FOR WHICH SCORING RESULT IS TO BE OBTAINED — 5415 |
| | unit | CHARACTER STRING SPECIFYING UNIT OF ANSWER SHEET FOR WHICH SCORING RESULT IS TO BE OBTAINED — 5416 |
| | token | TOKEN CHARACTER STRING — 5417 |
| | status | CHARACTER STRING INDICATING SCORING STATE — 5418 |
| | score | TOTAL SCORE — 5501 |
| | (BLANK LINE) | |
| 5013 — MESSAGE BODY | | |
| | NAME | DESCRIPTION |
| | answersheet | IMAGE DATA OF SCORED ANSWER SHEET — 5419 |

| 5001 | REQUEST LINE | GET base + /getsroedsheet HTTP/1.1 | |
|---|---|---|---|
| 5002 | REQUEST HEADER | | |
| | NAME | DESCRIPTION | |
| | printerid | CHARACTER STRING IDENTIFYING PRINTER | 5404 |
| | subject | CHARACTER STRING SPECIFYING SUBJECT OF ANSWER SHEET FOR WHICH SCORING RESULT IS TO BE OBTAINED | 5405 |
| | unit | CHARACTER STRING SPECIFYING UNIT OF ANSWER SHEET FOR WHICH SCORING RESULT IS TO BE OBTAINED | 5406 |
| | token | TOKEN CHARACTER STRING | 5407 |
| | (BLANK LINE) | | |
| 5003 | MESSAGE BODY | NONE | |

| 5011 | STATUS LINE | HTTP/1.1 200 OK | |
|---|---|---|---|
| 5012 | STATUS HEADER | | |
| | NAME | DESCRIPTION | |
| | printerid | CHARACTER STRING IDENTIFYING PRINTER | 5414 |
| | subject | CHARACTER STRING SPECIFYING SUBJECT OF ANSWER SHEET FOR WHICH SCORING RESULT IS TO BE OBTAINED | 5415 |
| | unit | CHARACTER STRING SPECIFYING UNIT OF ANSWER SHEET FOR WHICH SCORING RESULT IS TO BE OBTAINED | 5416 |
| | token | TOKEN CHARACTER STRING | 5417 |
| | status | CHARACTER STRING INDICATING SCORING STATE | 5418 |
| | nextsubject | CHARACTER STRING SPECIFYING SUBJECT OF ANSWER SHEET TO BE PRINTED NEXT | 5601 |
| | nextunit | CHARACTER STRING SPECIFYING UNIT OF ANSWER SHEET TO BE PRINTED NEXT | 5602 |
| | (BLANK LINE) | | |
| 5013 | MESSAGE BODY | | |
| | NAME | DESCRIPTION | |
| | answersheet | IMAGE DATA OF SCORED ANSWER SHEET | 5419 |

MULTIFUNCTION PERIPHERAL, SERVER, AND SYSTEM

BACKGROUND

Field

The present disclosure relates to a multifunction peripheral, a server, and a system.

Description of the Related Art

In recent years, with the popularization of IT terminals, such as personal computers, smartphones, and tablets, there have been advances in introduction and utilization of IT technology in educational institutions. The utilization of IT in educational institutions includes provision of educational materials for learning in schools and homes as well as the conducting of tests for ascertaining academic aptitude. Meanwhile, there is still a demand for conducting tests on paper due to concerns of worsening vision due to a prolonged use of IT terminals, and as preparation for admission tests, which require that answers be filled in by hand on an answer sheet, and the like. Therefore, there have been advances in the introduction of techniques for using IT technology for performing scoring based on images of paper test answer sheets and for managing performance. For example, Japanese Patent Laid-Open No. 2017-156548 discloses that a learning support server transmits image data of a short answer field of an answer sheet received from an image forming apparatus or the like to a scorer's terminal. It also discloses that the learning support server analyzes a learning state based on a scoring result of short answers and the like received from the scorer's terminal.

SUMMARY

According to an embodiment of the present disclosure, there is provided a multifunction peripheral comprising: a reading unit configured to read a filled-in answer sheet on which an answer has been filled in; a transmitting unit configured to transmit, to a server, data related to the filled-in answer sheet read by the reading unit; a receiving unit configured to receive, from a server, data related to a correctness of the answer that has been filled in on the filled-in answer sheet; and a printing unit configured to execute, based on the data related to the correctness of the answer that has been received by the receiving unit, first print processing for printing a scoring result of the answer.

According to another embodiment of the present disclosure, there is provided a server that is capable of communicating with a multifunction peripheral including a reading unit configured to read a document and a printing unit configured to print an image, the server comprising: a receiving unit configured to receive, from the multifunction peripheral, data related to a filled-in answer sheet read by the reading unit; and a transmitting unit configured to transmit, to the multifunction peripheral, data related to a correctness of an answer that has been filled in on the filled-in answer sheet.

According to still another embodiment of the present disclosure, there is provided a system including a multifunction peripheral and a server, the multifunction peripheral comprising: a reading unit configured to read a filled-in answer sheet on which an answer has been filled in; a transmitting unit configured to transmit, to a server, data related to the filled-in answer sheet read by the reading unit; a receiving unit configured to receive, from a server, data related to a correctness of the answer that has been filled in on the filled-in answer sheet; and a printing unit configured to execute, based on the data related to the correctness of the answer that has been received by the receiving unit, first print processing for printing a scoring result of the answer, and the server comprising: a receiving unit configured to receive, from the multifunction peripheral, the data related to the filled-in answer sheet read by the reading unit; and a transmitting unit configured to transmit, to the multifunction peripheral, the data related to the correctness of the answer that has been filled in on the filled-in answer sheet.

Further features of the present disclosure will become apparent from the following description of exemplary embodiments (with reference to the attached drawings).

BRIEF DESCRIPTION OF THE DRAWINGS

FIG. 7 is a diagram illustrating an example of an answer sheet.

FIG. 8 is a diagram illustrating an example of a filled-in answer sheet.

FIG. 9 is a diagram illustrating an example of a scored answer sheet.

FIG. 10A is a diagram illustrating a data structure of an API request.

FIG. 10B is a diagram illustrating a data structure of an API response.

FIG. 11A is a diagram illustrating a data structure of an API request.

FIG. 11B is a diagram illustrating a data structure of an API response.

FIG. 12A is a diagram illustrating a data structure of an API request.

FIG. 12B is a diagram illustrating a data structure of an API response.

FIG. 13A is a diagram illustrating a data structure of an API request.

FIG. 13B is a diagram illustrating a data structure of an API response.

FIG. 14A is a diagram illustrating a data structure of an API request.

FIG. 14B is a diagram illustrating a data structure of an API response.

FIG. 16 is a flowchart for explaining processing details of a CPU of the learning management server.

FIG. 23A is a diagram illustrating a data structure of an API request.

FIG. 23B is a diagram illustrating a data structure of an API response.

FIG. 26A is a diagram illustrating a data structure of an API request.

FIG. 26B is a diagram illustrating a data structure of an API response.

DESCRIPTION OF THE EMBODIMENTS

Figure 1:
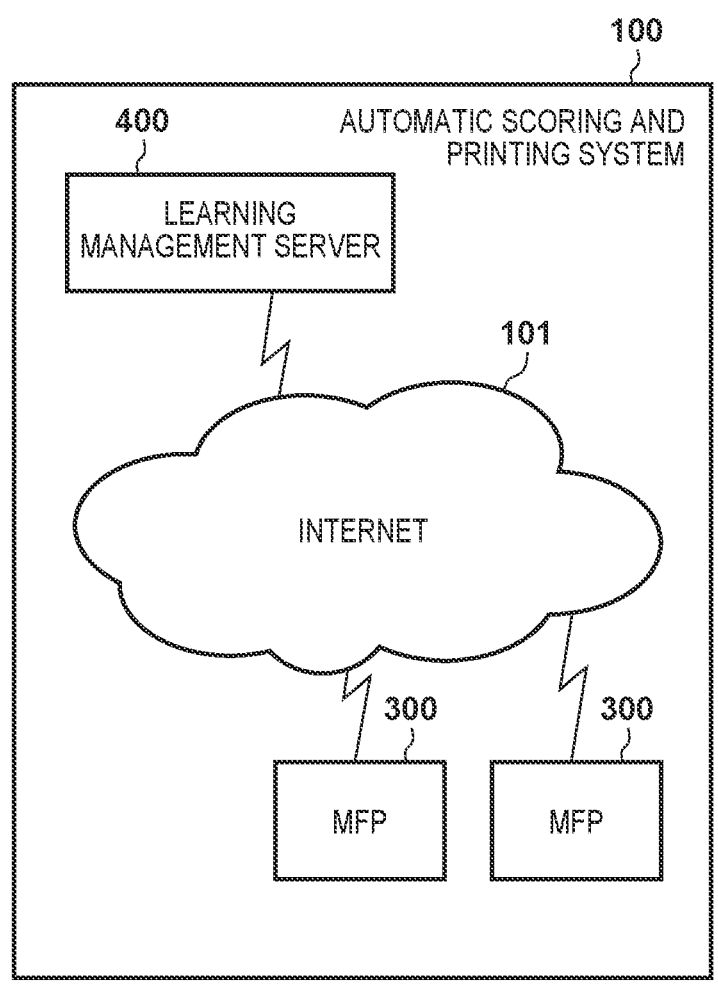
FIG. 1 is a diagram illustrating a configuration of an automatic scoring and printing system according to an embodiment.

In the above prior art, since scoring results and performance are managed by the learning support server, a user must confirm the scoring results and the like using an IT terminal connected to the learning support server. Therefore, it takes effort to confirm the scoring results and the like, and for example, in cases where a minor has performed a test, it may be difficult for the minor themself to look up a scoring result.

The present disclosure provides a technique for enabling an easy confirmation of a scoring result in a system for scoring a test performed on paper.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

First Embodiment

<Overall Configuration of System>

FIG. 1 is a diagram illustrating a configuration of an automatic scoring and printing system 100 (hereinafter, referred to as system 100) according to an embodiment. The system 100 is a system for automatically scoring a result of a test performed on paper by a user and printing a scoring result thereof. When a scanner unit 315 of a multifunction printer 300 (hereinafter, referred to as MFP 300) reads a filled-in answer sheet on which the user has filled in answers, scoring is performed based on the read image data, and a scoring result is printed by a printing unit 317 of the MFP 300. A test may be scored, for example, using learning content managed by a learning management server 400 itself. This enables the user to perform a test on paper and easily confirm a scoring result thereof while being at home, for example.

The system 100 includes a plurality of MFPs 300 and the learning management server 400, which are connected to each other via the Internet 101. However, some or all of them may be connected so as to be able to communicate on the same local area network (LAN). If each apparatus is connected via the Internet 101, each apparatus may be installed and used at a remote location. Existing techniques can be used for a configuration in which each of the MFPs 300 and the learning management server 400 connects to the Internet 101. For example, a method for using a wired LAN, a wireless LAN, a cellular telephone line, and the like may be used.

Although the learning management server 400 for providing a learning management service is illustrated as a single physical server in FIG. 1, functions included in the learning management server 400 may be realized by a plurality of physical servers. The learning management server 400 may be constructed as a virtual server in a cloud service. Further, the system 100 may include a terminal device, such as a smartphone, a tablet, or a personal computer; the terminal device may communicate with the learning management server 400 to confirm a learning state; and various settings of the MFP 300 may be performed by the terminal device.

<Learning Management Server>

Figure 2:
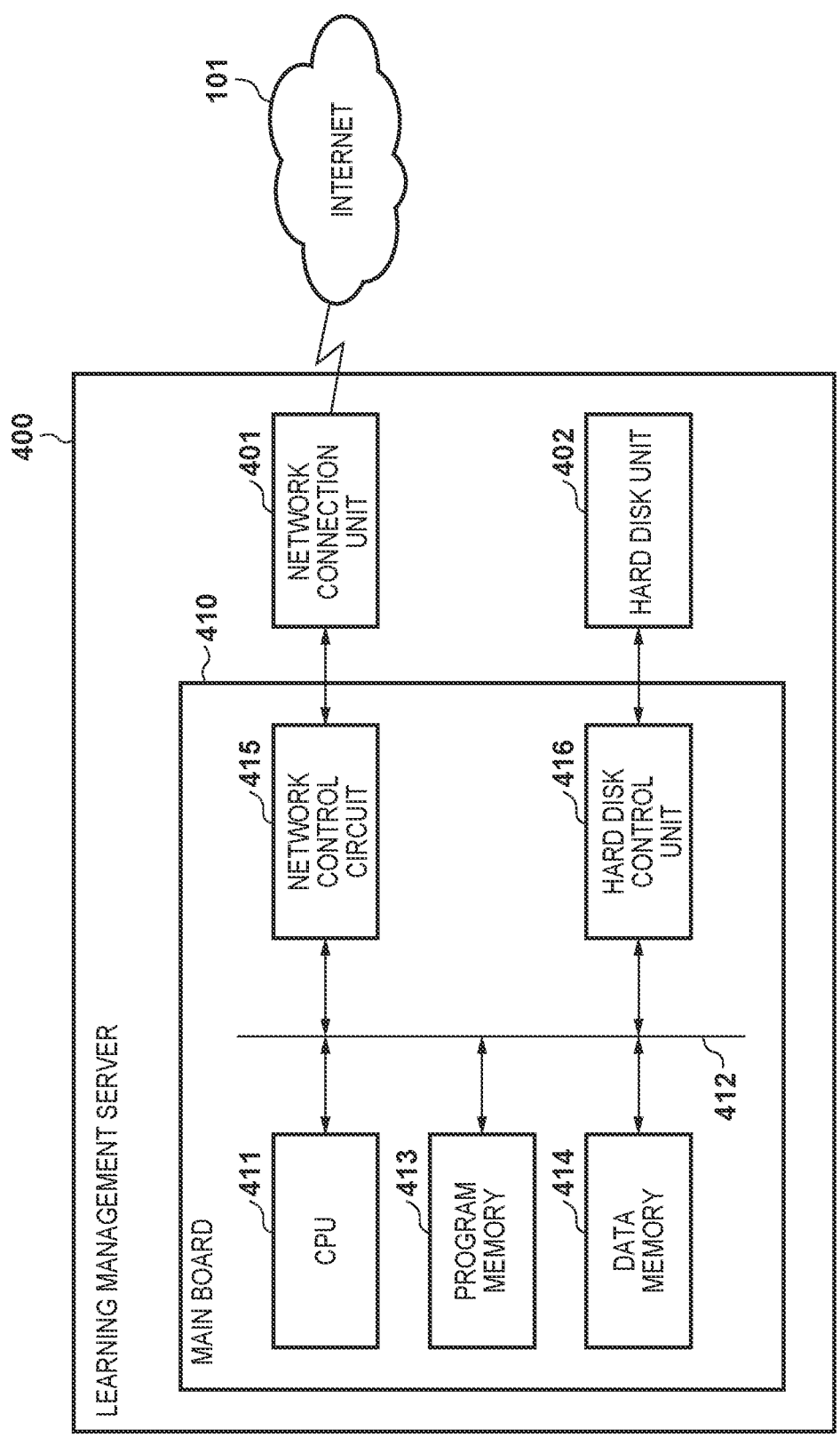
FIG. 2 is a block diagram illustrating a configuration of a control system of a learning management server.

FIG. 2 is a block diagram illustrating a configuration of a control system of the learning management server 400. The learning management server 400 includes a main board 410 for controlling the entire apparatus, a network connection unit 401, and a hard disk unit 402. The main board 410 is provided with a CPU 411, a program memory 413, a data memory 414, a network control circuit 415, and a hard disk control circuit 416, which are connected via an internal bus 412.

The CPU 411 in a form of a microprocessor operates in accordance with control programs stored in the program memory 413 and contents of the data memory 414. The CPU 411 also controls the network connection unit 401 via the network control circuit 415 to communicate with another apparatus via the Internet 101. The CPU 411 can read and write data to and from the hard disk unit 402 connected via the hard disk control circuit 416. The hard disk unit 402 stores an operating system that is loaded into the program memory 413 and used, control software of the learning management server 400, and various types of data. That is, various functions of the learning management server 400 are realized by the CPU 411 reading the control programs stored in the hard disk unit 402 in the program memory 413 and then executing them.

Figure 3:
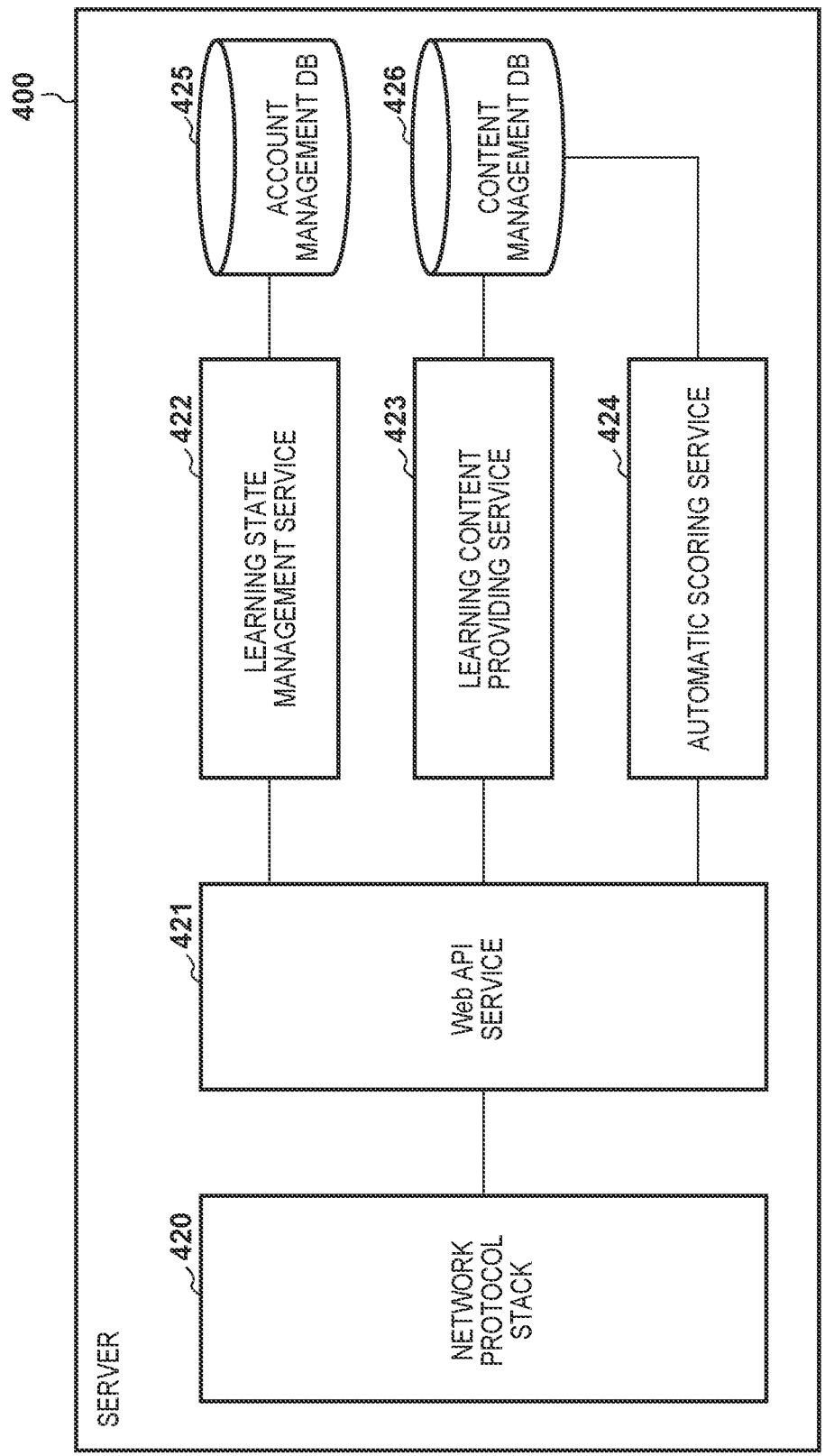
FIG. 3 is a diagram illustrating a configuration of software modules that operate on the learning management server.

FIG. 3 is a diagram illustrating a configuration of software modules that operate on the learning management server 400. Each module operates on an operating system (OS) operating on the learning management server 400. Specifically, each module operates by a control program or data stored in the hard disk unit 402 being loaded into the program memory 413 and the data memory 414 as appropriate and then being executed.

A network protocol stack 420 is a module for performing control conforming to various network protocols, such as the Hypertext Transfer Protocol (HTTP) and the Transmission Control Protocol/Internet Protocol (TCP/IP).

A web application programming interface (web API) service 421 is a module for performing web API processing as the learning management server 400. The web API is defined as a data structure to be exchanged by the HTTP protocol. The web API service 421 makes a request for processing to each of a learning state management service 422, a learning content providing service 423, and an automatic scoring service 424 in accordance with contents of an HTTP request received using the network protocol stack 420. The web API service 421 receives a result of processing by each module for which the request has been made and performs processing for returning an HTTP response using the network protocol stack 420.

The learning state management service 422 is a module for executing processing for managing a learning state of each user who uses the learning management service. The learning state management service 422 uses an account management DB 425 stored in the hard disk unit 402 to manage a state of progress in learning of each user and performance on learning tests they performed.

The learning content providing service 423 is a module for executing processing for providing learning content to the user. The learning content includes textbooks to be learned by the user; question sheet data, answer sheet data, correct answer data, and explanation data of learning tests for grasping a learning state; and the like. This learning content is stored in a content management DB 426 stored on the hard disk unit 402. The learning content providing service 423 performs processing for extracting and returning necessary content from the content management DB 426 in accordance with contents of a request that has been made by the web API service 421.

The automatic scoring service 424 is a module for receiving answers to a learning test performed by the user and executes processing for performing automatic scoring. According to contents of a request has been made from the web API service 421, the automatic scoring service 424 obtains, from the content management DB 426, correct answer information corresponding to a learning test performed by the user and performs automatic scoring processing for answer data of the learning test. The answer data is transmitted from the MFP 300 to the learning management server 400, for example, by processing which will be described later. A result of automatic scoring processing is used in an HTTP response returned by the web API service 421, and the automatic scoring service 424 also coordinates with the learning state management service 422 to record and reflect the result in the account management DB 425 as performance information of the learning test performed by the user.

Although FIG. 3 assumes that the learning management server 400, which provides the learning management service, is constructed as a single physical server as described above, a configuration may be taken such that the above plurality of modules may be constructed by distributing them among two or more physical servers. For example, the learning state management service 422, the learning content providing service 423, and the automatic scoring service 424 may each be operated on a different physical server. In addition, an application server providing these services and a database server providing the account management DB 425 and the content management DB 426 may each be operated on a different physical server.

Figure 4:
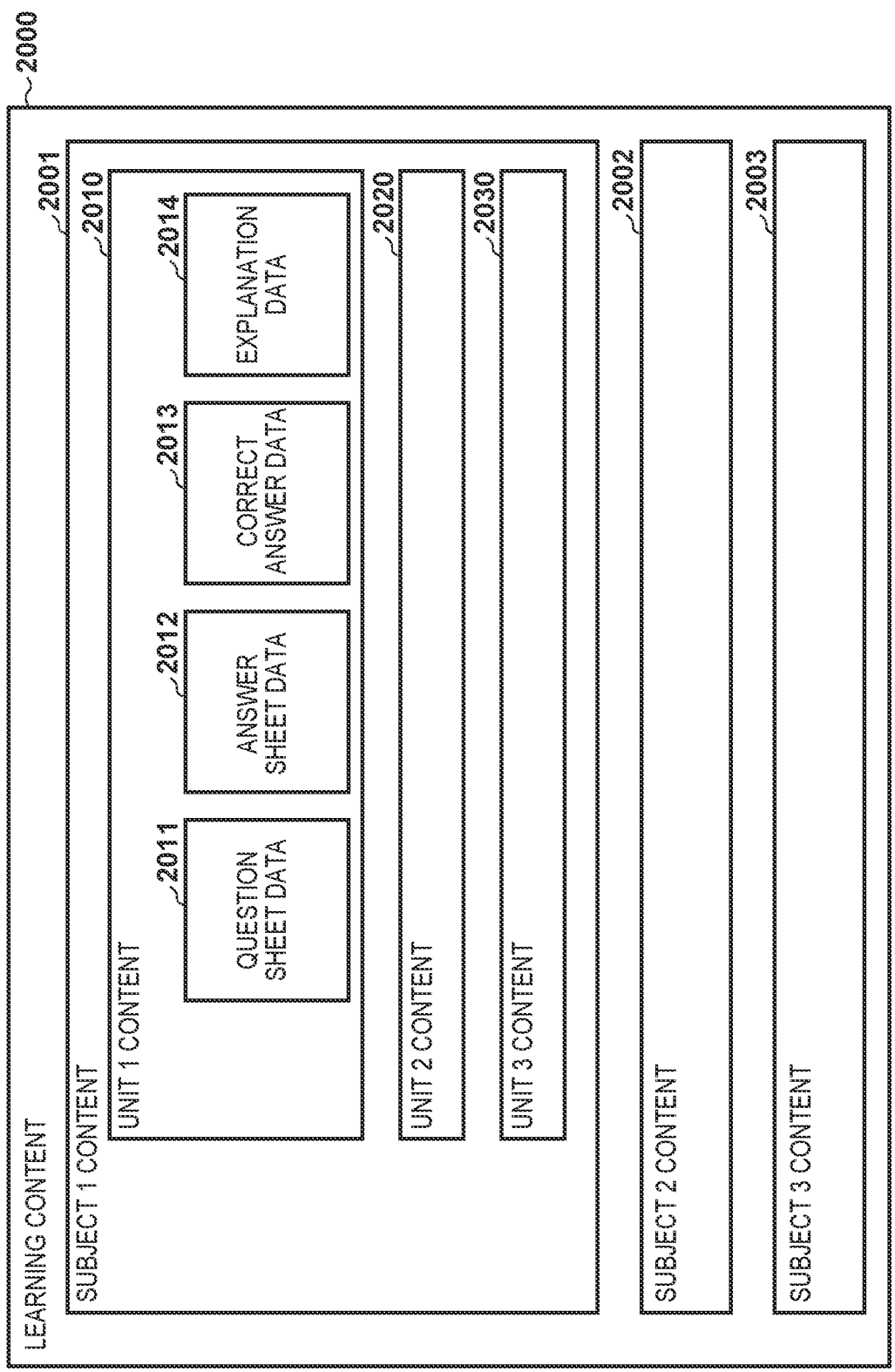
FIG. 4 is a diagram illustrating a configuration of learning content stored in a content management DB of the learning management server.

FIG. 4 is a diagram illustrating a configuration of learning content 2000 stored in the content management DB 426 of the learning management server 400. The learning content 2000 includes a plurality of subject content 2001, 2002, and 2003. Although illustrations have been omitted for the subject content 2002 and 2003, the subject content 2001, 2002, and 2003 each include a plurality of unit content 2010, 2020, and 2030. Although illustrations have been omitted for the unit content 2020 and 2030, unit content 2010, 2020, and 2030 each include question sheet data 2011, answer sheet data 2012, correct answer data 2013, and explanation data 2014.

The question sheet data 2011 is a complete set of data necessary for printing a question sheet. It may be an image file including a visualized image of a question sheet, a page description file in a page description language (hereinafter, PDL), or data of another format.

The answer sheet data 2012 is a complete set of data necessary for printing an answer sheet 2100. It may be an image file including a visualized image of the answer sheet 2100, a page description file in a PDL, or data of another format.

The correct answer data 2013 is a complete set of correct answer data for each question. The automatic scoring service 424 of the learning management server 400 performs automatic scoring processing using answer data transmitted from the MFP 300 and the correct answer data 2013. Alternatively, the correct answer data 2013 may be transmitted to the MFP 300 to perform automatic scoring processing on the MFP 300 side.

The explanation data 2014 is a complete set of data necessary for presenting an explanation for each question to the user. The explanation data 2014 may be a text file including explanation information, an image file including a visualized image, a PDL page description file, or data of another format.

The learning management server 400 transmits these content to the MFP 300 in response to a request from the MFP 300 or uses them in the respective services in the learning management server 400.

<MFP>

Figure 5:
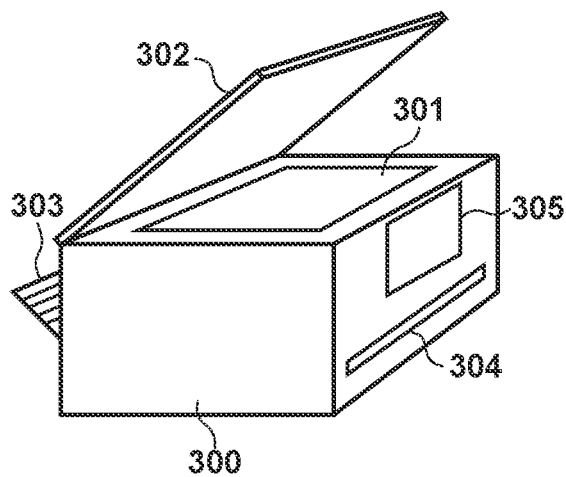
FIG. 5 is an external view of an MFP.

FIG. 5 is an external view of the MFP 300. The MFP 300 in the present embodiment is a multifunction peripheral provided with a combination of a printing apparatus, a scanner, and other functions. A document table 301 is a glass-like transparent table and is used for when placing on it a document to be read by the scanner. A document table pressing plate 302 is a cover for pressing a document against the document table 301 so that the document does not float when being read by the scanner as well as preventing external light from entering a scanner unit. A printing sheet insertion port 303 is an insertion port at which to set sheets of various sizes used for printing. The sheets set here are conveyed one by one to a printing unit and are discharged from a printing sheet discharging port 304 after desired printing has been performed. A touch-panel-type operation panel 305 is provided on a front surface of the MFP 300, and here, the user can perform operations for inputting a job and performing various settings for the MFP 300.

Figure 6:
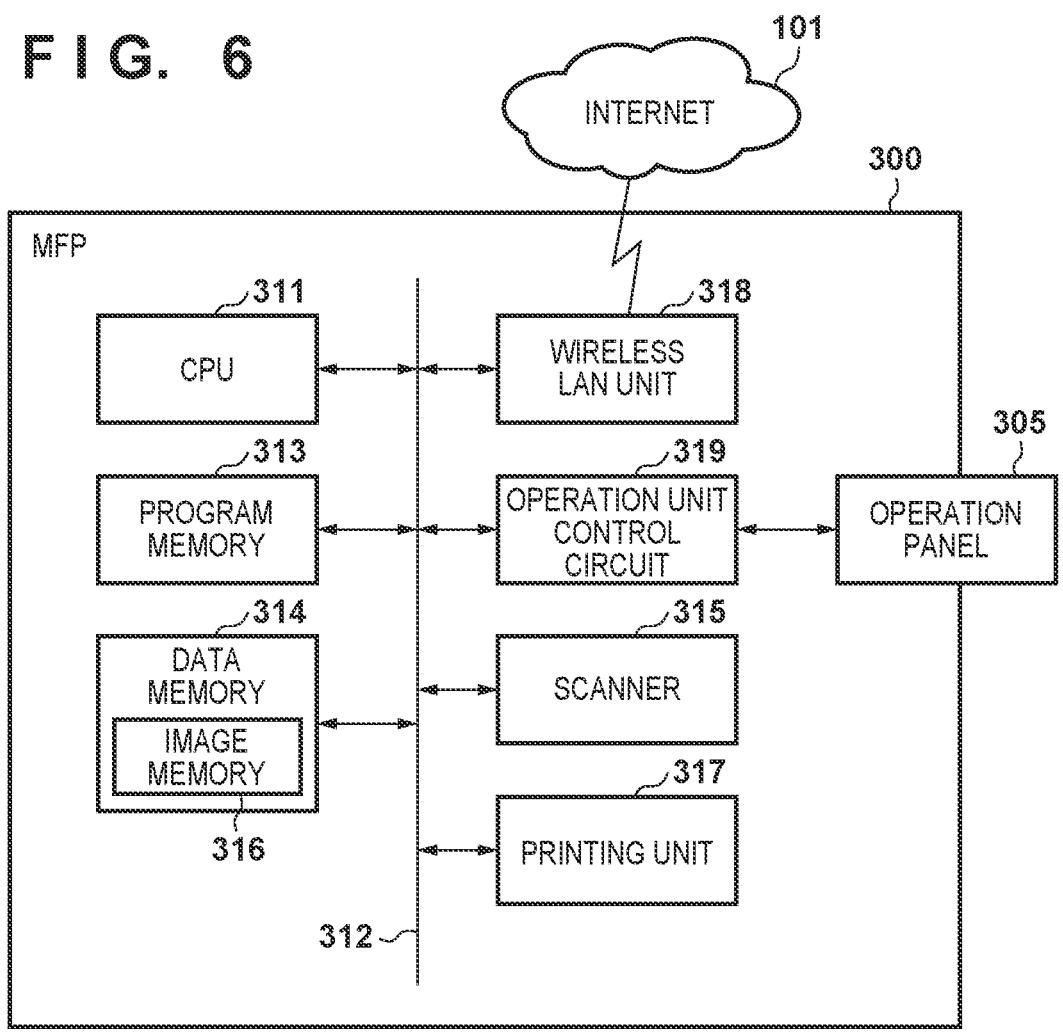
FIG. 6 is a block diagram illustrating a configuration of a control system of the MFP.

FIG. 6 is a block diagram illustrating a configuration of a control system of the MFP 300. A CPU 311 in a form of a microprocessor comprehensively controls respective components of the MFP 300. The CPU 311 realizes various functions by operating in accordance with control programs stored in a program memory 313 in a form of a ROM and contents of a data memory 314 in a form of a RAM, which are connected via an internal bus 312.

The scanner unit 315 reads a document placed on the document table 301. Image data, which is a result of the reading, is stored in an image memory 316 in the data memory 314. The printing unit 317 prints on a printing medium an image stored in the image memory 316 in the data memory 314. A wireless LAN unit 318 is connected to the Internet 101 via an externally provided wireless LAN access point (not illustrated). That is, the CPU 311 communicates with another apparatus via the wireless LAN unit 318. An operation unit control circuit 319 is a circuit for causing the touch-panel-type operation panel 305 to display a state of the apparatus, a function selection menu, and the like and for receiving an operation to the operation panel 305 by the user.

By the CPU 311 controlling these components, the MFP 300 provides the user with various functions. For example, the CPU 311 can obtain a print job from the server 400 connected via the Internet 101 and control the printing unit 317 to print it on a printing medium. Further, the CPU 311 can control the scanner unit 315 to transmit a read image of a document to the server 400 or another apparatus. Further, the CPU 311 can start an operation of the apparatus upon receiving user input to the operation panel 305 and can also execute, for example, a copy function for printing with the printing unit 317 an image of a document read by controlling the scanner unit 315. That is, the CPU 311 can control reading of a document by the scanner unit 315, printing of an image by the printing unit 317, and transmission and reception of various data by the wireless LAN unit 318.

<Answer Sheet>

FIG. 7 is a diagram illustrating an example of the answer sheet 2100. The answer sheet 2100 is a sheet on which answers are to be filled in by the user of the system 100 when performing a test. For example, the user prints with the MFP 300 the answer sheet 2100 of a subject and unit for which they want to perform a test. At that time, the MFP 300 obtains target answer sheet data from the learning management server 400.

At a topmost portion of the answer sheet 2100, a subject name 2101 and a unit name 2102 are printed. Below that are provided, starting from the left, a name fill-in field 2103, a performed date fill-in field 2104, and a total score field 2105. Therebelow are provided answer fields in order of sections 1, 2 and 3. A section numeral 2106 indicates a numeral assigned to a respective section. A marked answer field 2108 is used as an answer field for multiple choice questions and is for answering by filling one of the options. A short answer field 2109 is used as an answer field for words, short sentences, and the like and is for answering by filling it in by hand with words or short sentences. A freewriting answer field 2110 is used as an answer field for long sentences and equations and is for answering by filling it in with sentences, equations, and the like. A section score field is for filling it in with a scores for a respective section.

FIG. 8 is a diagram illustrating an example of a filled-in answer sheet 2200. The filled-in answer sheet 2200 is a sheet in a state in which the user has filled in answers on the answer sheet 2100 by performing a test. The name fill-in field 2103 is filled in with a school year, class, and name 2205. The performed date fill-in field 2104 is filled in with a performed date 2206. The marked answer field 2108 is filled in with a marked answer 2201 in which an option has been filled. The short answer field 2109 is filled in with a short answer 2202 using a numerical value, a term, or a short sentence. The freewriting answer field 2110 is filled in with freewriting answers 2203 and 2204 using equations.

When the answer sheet 2100 is configured as described above, in order to perform scoring processing based on an image obtained by reading the filled-in answer sheet 2200, it is conceivable to use the following techniques. Regarding the marked answer field 2108, by managing arrangement information of a marked field in the content management DB 426 for each type of the answer sheet 2100, it is possible to determine whether or not a mark at a predetermined position is filled and thereby obtain which option has been selected as an answer. Automatic scoring can be performed by comparing this against correct answer data. Regarding the short answer field 2109, filled-in answer information can be obtained by performing conversion from image information at a predetermined position of the filled-in answer sheet 2200 into character information using an optical character recognition (OCR) technology. Automatic scoring can be performed by comparing this against correct answer data. Regarding the freewriting answer field 2110, answer information can similarly be obtained using an OCR technique. From this, automatic scoring can also be performed by calculating a rate of coincidence with correct answer data, a keyword detection rate, and the like. For cases that require more precise scoring, are difficult to score automatically due to long sentence answers, and the like, it is conceivable to transfer data to a scorer and have it scored manually. Due to recent advances in machine learning technology, it is also considered possible to expand the scope in which automatic scoring is possible.

FIG. 9 is a diagram illustrating an example of a scored answer sheet 2300. The answer sheet 2300 is a sheet in a state in which a scoring result has been filled in with respect to the filled-in answer sheet 2200. For each answer, a correct answer mark 2301 is made on an answer field portion of a correct answer. In addition, an incorrect answer mark 2302 is made on an answer field portion of an incorrect answer. A section score field is filled in with a total value of a score for a respective section as a section score 2303. The total score field 2105 is filled in with a total value of all the section scores 2303 as a total score 2304.

<Data Structure>

Data structures to be exchanged between the MFP 300 and the learning management server 400 will be described with reference to FIGS. 10A to 14B.

FIG. 10A is a diagram illustrating a data structure of a test data request 5000a, which is an example of an API request. The test data request 5000a is a request that the MFP 300 transmits when making a request for image data of a test answer sheet to the learning management server 400. The test data request 5000a is transmitted from the MFP 300 to the learning management server 400 as an HTTP request (see steps S6009 and S6109 of FIG. 15). The entire test data request 5000a is described as text data, and a structure is determined in line units separated by a line feed code. In the present embodiment, the test data request 5000a is configured to include a request line 5001, a request header 5002, and a message body 5003.

A first line of the test data request 5000a is the request line 5001. The request line 5001 begins with an HTTP method by which the request is made, followed by a universal resource identifier (URI) for identifying a resource to be requested, and a protocol version notation, and is terminated by a line feed code. Here, the URI is a combination of a "base", which is a URI indicating the location of the learning management server 400, and a character string indicating the type of the API request.

From the line subsequent to the request line 5001 until the line at which the first blank line appears is the request header

5002. The request header 5002 is used for passing the request and additional information related to an HTTP client, which is a request source, to an HTTP server, which is a request destination.

Lines subsequent to the blank line after the request header 5002 are called the message body 5003. Depending on the type of the HTTP method for the request, the message body 5003 describes the data itself to be passed from the HTTP client to the HTTP server. Depending on the HTTP method, there may be no message body 5003.

Next, specific description contents included in the test data request 5000*a* will be described. In the request line 5001, regarding the URI following the GET method, a request type "/getanswersheet" is specified following a "base", which is the URI of the learning management server 400. The following are stored as parameters in the request header 5002. A "printerid" describes a character string 5004 identifying a printer. A value that is unique to the MFP 300, converted into a character string is used as the character string 5004 for identifying the printer. For example, a MAC address used for network communication, an IP address, a product serial number that has been converted into a character string, or a combination of a plurality thereof may be used. A "subject" describes a character string 5005 specifying a subject of the answer sheet 2100 to be obtained. Here, the character string 5005 specifying the subject is obtained by extracting a character string corresponding to a subject selected by the user on a subject selection screen 1100 from a subject character string list 5115 obtained in response to a subject list request 5000*b*, which will be described later. A "unit" describes a character string 5006 specifying a unit of the answer sheet 2100 to be obtained. Here, the character string 5006 specifying the unit is obtained by extracting a character string corresponding to a unit selected by the user on a unit selection screen 1110 from a unit character string list 5216 obtained in response to a unit list request 5000*c*, which will be described later. In this request, there is no description in the message body 5003.

The test data request 5000*a* may include as appropriate descriptions other than those described above. For example, when a plurality of users take a learning test using the same MFP 300, a configuration may be taken so as to, in addition to the character string 5004 identifying the printer, describe account information identifying the users and authentication information in the request header 5002 as parameters.

FIG. 10B is a diagram illustrating a data structure of an API response 5010*a*. When the learning management server 400 receives the test data request 5000*a* from the MFP 300, the API response 5010*a* is transmitted from the learning management server 400 to the MFP 300 as a response (see steps S6009 and S6109 of FIG. 15). The API response 5010*a* is transmitted as an HTTP response. The entire API response 5010*a* is described as text data, and a structure is determined in line units separated by a line feed code. In the present embodiment, the API response 5010*a* is configured to include a status line 5011, a status header 5012, and a message body 5013.

The first line of the API response 5010*a* is the status line 5011. The status line 5011 begins with a version of the protocol, and a numerical status code and a character string are terminated by a line feed code.

From the line subsequent to the status line 5011 until the line at which the first blank line appears is the status header 5012. The status header 5012 is used for passing to the HTTP client, which is the request source, additional information related to the status, data passed in the message body 5013 included in the HTTP response, and the like.

The lines subsequent to the blank line after the status header 5012 are called the message body 5013. The message body 5013 describes the data itself to be passed from the HTTP server to the HTTP client. Depending on the HTTP method, there may be no message body 5013.

Next, specific description contents included in the API response 5010*a* will be described. The following information, which is specified as parameters, is stored in the status header 5012. A "printerid" describes a character string 5014 identifying a printer. A "subject" describes a character string 5015 specifying a subject of the answer sheet 2100 to be obtained. A "unit" describes a character string 5016 specifying a unit of the answer sheet 2100 to be obtained.

The message body 5013 stores answer sheet data 5017, which is image data necessary for printing the answer sheet 2100 according to the specified parameters, in a text encoded format. Here, although the answer sheet data 5017, which is image data, is encoded and stored in the message body, it is not necessarily that the answer sheet data 5017 be in an image data format. For example, since there only needs to be included information necessary for the MFP 300 to print the answer sheet 2100, a configuration may be taken so as to store only layout information of an answer field.

FIG. 11A is a diagram illustrating a data structure of a subject list request 5000*b*, which is an example of an API request. The subject list request 5000*b* is a request that the MFP 300 transmits when making a request for a list of subjects to be learned to the learning management server 400. The subject list request 5000*b* is transmitted from the MFP 300 to the learning management server 400 as an HTTP request (see step S6001 of FIG. 15). Since the basic data structure of the subject list request 5000*b* is the same as that of the test data request 5000*a*, differences from the test data request 5000*a* will be mainly described below.

In the subject list request 5000*b*, regarding the URI following the GET method in the request line 5001, a request type "/getsubjectlist" is specified following a "base", which is the URI of the learning management server 400. The following information, which is specified as parameters, is stored in the request header 5002. A "printerid" describes a character string 5104 identifying a printer. In this request, there is no description in the message body 5003.

FIG. 11B is a diagram illustrating a data structure of an API response 5010*b*. When the learning management server 400 receives the subject list request 5000*b* from the MFP 300, the API response 5010*b* is transmitted from the learning management server 400 to the MFP 300 as a response (see step S6001 of FIG. 15).

The following information, which is specified as parameters, is stored in the status header 5012. A "printerid" describes a character string 5114 identifying a printer. In addition, the text-encoded subject character string list 5115 corresponding to the specified parameters is stored in the message body 5013.

FIG. 12A is a diagram illustrating a data structure of a unit list request 5000*c*, which is an example of an API request. The unit list request 5000*c* is a request that the MFP 300 transmits when making a request for a list of units to be learned to the learning management server 400. The unit list request 5000*c* is transmitted from the MFP 300 to the learning management server 400 as an HTTP request (see step S6003 of FIG. 15). Since the basic data structure of the unit list request 5000*c* is the same as that of the test data request 5000*a*, differences from the test data request 5000*a* will be mainly described below.

In the unit list request 5000*c*, regarding the URI following the GET method in the request line 5001, a request type "/getunitlist" is specified following a "base", which is the URI of the learning management server 400. The following are stored as parameters in the request header 5002. A "printerid" describes a character string 5204 identifying a printer. A "subject" describes a character string 5205 specifying a subject for which it is desired to obtain a list of units. Here, the character string 5205 specifying the subject is obtained by extracting a character string corresponding to a subject selected by the user on the subject selection screen 1100 from the subject character string list 5115 obtained in response to the above-described subject list request 5000*b*. In this request, there is no description in the message body 5003.

FIG. 12B is a diagram illustrating a data structure of an API response 5010*c*. When the learning management server 400 receives the unit list request 5000*c* from the MFP 300, the API response 5010*c* is transmitted from the learning management server 400 to the MFP 300 as a response (see step S6003 of FIG. 15).

The following information, which is specified as parameters, is stored in the status header 5012. A "printerid" describes a character string 5214 identifying a printer. A "subject" describes a character string 5215 specifying a subject. In addition, the text-encoded unit character string list 5216 corresponding to the specified parameters is stored in the message body 5013.

FIG. 13A is a diagram illustrating a data structure of a scoring request 5000*d*, which is an example of an API request. The scoring request 5000*d* is a request that the MFP 300 transmits when making a request for a score of a test that has been taken to the learning management server 400. The scoring request 5000*d* is transmitted from the MFP 300 to the learning management server 400 as an HTTP request (see step S6103 of FIG. 15). Since the basic data structure of the scoring request 5000*d* is the same as that of the test data request 5000*a*, differences from the test data request 5000*a* will be mainly described below.

In the scoring request 5000*d*, regarding the URI following the POST method in the request line 5001, a request type "/requestscoring" is specified following a "base", which is the URI of the learning management server 400. The following are stored as parameters in the request header 5002. A "printerid" describes a character string 5304 identifying a printer. A "subject" describes a character string 5305 specifying a subject to be scored. A "unit" describes a character string 5306 specifying a unit to be scored.

The message body 5003 stores text-encoded answer data 5307 generated from an image which has been obtained by the MFP 300 reading the filled-in answer sheet 2200. For example, this may be image data, which has been obtained by reading the filled-in answer sheet 2200, text-encoded as is and then stored. Alternatively, this may be information obtained by extracting only the information filled in by the user from the image data, which has been obtained by reading the filled-in answer sheet 2200, and then stored. That is, it is image data of the school year, class, and name 2205 filled in on the name fill-in field 2103; the performed date 2206 filled in on the performed date fill-in field 2104; marked answers 2201, 2202, 2203, and 2204 filled in on each marked answer field 2108, 2109, and 2110; and the like. Further, for example, regarding the marked answer 2201 portion filled in on the marked answer field 2108, bit information on whether each marked answer field 2108 has been filled in may extracted and stored as a result of analyzing the image. Further, for example, regarding character information filled in on the name fill-in field 2103, the short answer field 2109, and the freewriting answer field 2110, a configuration may be taken so as to perform OCR processing in the MFP 300 to extract and store text information.

FIG. 13B is a diagram illustrating a data structure of an API response 5010*d*. When the learning management server 400 receives the scoring request 5000*d* from the MFP 300, the API response 5010*d* is transmitted from the learning management server 400 to the MFP 300 as a response (see step S6103 of FIG. 15).

The following information, which is specified as parameters, is stored in the status header 5012. A "printerid" describes a character string 5314 identifying a printer. A "subject" describes a character string 5315 specifying a subject. A "unit" describes a character string 5316 specifying a unit.

In the status header 5012, the following information is stored subsequently thereafter. A "status" stores a character string 5317 indicating a reception state of the scoring request 5000*d* and an execution status of the scoring processing. Thus, the MFP 300 can know whether or not the scoring request 5000*d* has succeeded and whether or not execution of the scoring processing has started or ended. A "token" stores a token character string 5318 for obtaining a scoring result. Here, the token character string 5318 is a character string uniquely identifying data for which the scoring request 5000*d* has been made and is a character string generated by the learning management server 400. The token character string 5318 is used to specify which scoring result is to be obtained in a scoring result request 5000*e*, which will be described later. In this response, there is no description in the message body 5013.

The parameters of the scoring request 5000*d* may include the date and time at which the answer sheet 2100 was printed, the date and time at which the learning test was taken, and the like. In addition, when the same answer sheet 2100 is used repeatedly and for multiple times for learning or the like, information may be added as to which repetition it is.

FIG. 14A is a diagram illustrating a data structure of the scoring result request 5000*e*, which is an example of an API request. The scoring result request 5000*e* is a request that the MFP 300 transmits when making a request for a scoring result of a test that has been taken to the learning management server 400. The scoring result request 5000*e* is transmitted from the MFP 300 to the learning management server 400 as an HTTP request (see step S6105 of FIG. 15). Since the basic data structure of the scoring result request 5000*e* is the same as that of the test data request 5000*a*, differences from the test data request 5000*a* will be mainly described below.

In the scoring result request 5000*e*, regarding the URI following the GET method in the request line 5001, a request type "/getscoredsheet" is specified following a "base", which is the URI of the learning management server 400. The following are stored as parameters in the request header 5002. A "printerid" describes a character string 5404 identifying a printer. A "subject" describes a character string 5405 specifying a subject. A "unit" describes a character string 5406 specifying a unit. A "token" describes a token character string 5407 specifying a scoring result to be obtained. Here, the token character string 5407 is the token character string 5318 passed in the above-described scoring request response. In this request, there is no description in the message body 5003.

FIG. 14B is a diagram illustrating a data structure of an API response 5010*e*. When the learning management server 400 receives the scoring result request 5000*e* from the MFP 300, the API response 5010e is transmitted from the learning management server 400 to the MFP 300 as a response (see step S6005 of FIG. 15).

The following information, which is specified as parameters, is stored in the status header 5012. A "printerid" describes the character string 5314 identifying a printer. A "subject" describes the character string 5315 specifying a subject. A "unit" describes the character string 5316 specifying a unit. A "token" describes a token character string 5417 specifying a scoring result to be obtained.

In the status header 5012, the following information is stored subsequently thereafter. A "status" stores a character string 5418 indicating an execution state of the scoring processing. Thus, the MFP 300 can know whether execution of the scoring processing has been completed. If the execution of the scoring processing has been completed, scoring result data 5419, which is image data necessary for printing the scored answer sheet 2300 corresponding to a specified token character string 5418 parameter, will be text encoded and stored in the message body 5013. For this, for example, an image itself of the scored answer sheet 2300, which is a visualized image may be text encoded and stored. In addition, an image in which only the correct answer mark 2301, the incorrect answer mark 2302, the section scores 2303, and the total score 2304, which are the scoring result, are visualized with respect to an image which has been obtained by reading the filled-in answer sheet 2200 may be text-encoded and stored. If the MFP 300 holds an image obtained by reading the filled-in answer sheet 2200, the MFP 300 can superimpose and composite the scoring result data 5419 to print the scored answer sheet 2300. Furthermore, regarding the correct answer mark 2301, the incorrect answer mark 2302, the section scores 2303, and the total score 2304, an arrangement, type, and a content of a mark may be configured to be stored as text rather than as a visualized image. The MFP 300 can perform image compositing for the correct answer mark 2301, the incorrect answer mark 2302, the section scores 2303, and the total score 2304 from the scoring result data 5419 by superimposing and compositing them onto an image obtained by reading the filled-in answer sheet 2200 and print the scored answer sheet 2300. Meanwhile, if execution of scoring processing has not been completed, there is no description in the message body 5013.

<Operation Example of Entire System>

Figure 15:
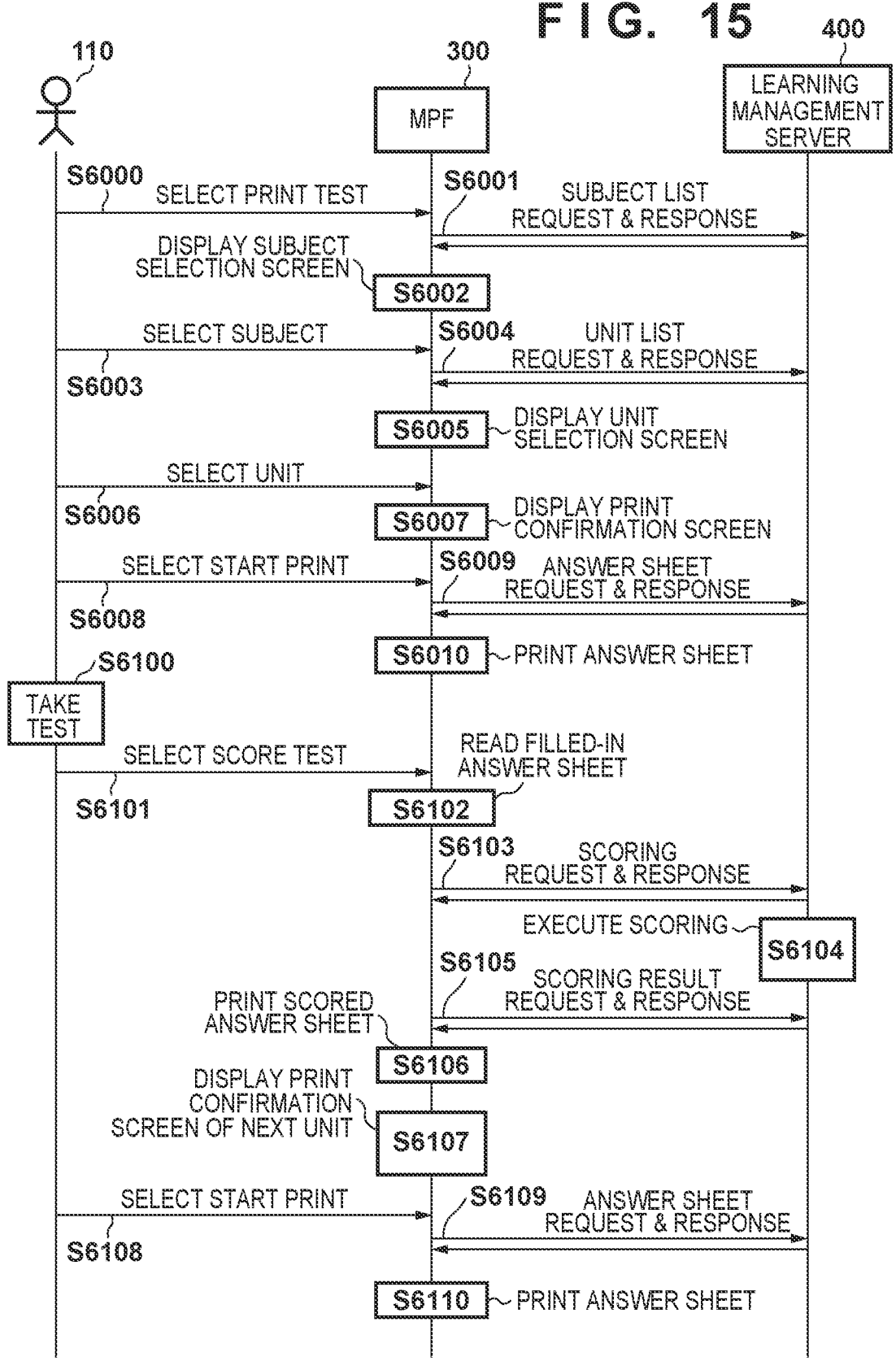
FIG. 15 is a sequence diagram for explaining operations of an entire automatic scoring and printing system 100.

FIG. 15 is a sequence diagram for explaining operations of the entire system 100 in the present embodiment. This drawing illustrates a relationship regarding exchange of data and the like between a user 110, the MFP 300, and the learning management server 400 when the following operations are performed. That is, the user 110 operates the operation panel 305 of the MFP 300 to specify a subject and a unit and print the answer sheet 2100 of a learning test. Next, the user 110 takes the learning test corresponding to the printed answer sheet 2100 and operates the operation panel 305 of the MFP 300 again to request scoring of the filled-in answer sheet 2200. Then, the user 110 prints the scored answer sheet 2300, which has been obtained as a scoring result and then prints the answer sheet 2300 of the next unit. This is a relationship regarding exchange of data and the like for when these operations are performed. In the explanation of the respective figures below, respective steps are simply referred to as S6000 and the like.

In S6000, the user 110 operates the operation panel 305 of the MFP 300 and presses a "print test" button 1011 on a learning test function selection screen 1010. In S6001, the MFP 300 transmits the subject list request 5000b to the learning management server 400 and receives the subject character string list 5115 as a response (see FIGS. 11A and 11B). In S6002, the MFP 300 displays a subject selection screen 1100 based on the received subject character string list 5115.

In S6003, the user 110 presses any of subject selection buttons 1101 to 1103 on the subject selection screen 1100. In S6004, the MFP 300 transmits the unit list request 5000c to the learning management server 400 and receives the unit character string list 5216 as a response (see FIGS. 12A and 12B). In S6005, the MFP 300 displays the unit selection screen 1110 based on the received unit character string list 5216.

In S6006, the user 110 presses any of unit selection buttons 1111 to 1113 on the unit selection screen 1110. In S6007, the MFP 300 displays a print confirmation screen 1120 to confirm whether to print the answer sheet 2100 of the selected subject and unit.

In S6008, the user 110 presses a "start print" button 1122 on the print confirmation screen 1120. In S6009, the MFP 300 transmits an answer sheet request to the learning management server 400 and receives the answer sheet data 5017 as a response (see FIGS. 10A and 10B). In S6010, the MFP 300 prints the answer sheet 2100 based on the answer sheet data 5017 received from the learning management server 400 in S6009.

In S6100, the user 110 takes a learning test using the printed answer sheet 2100 and creates the filled-in answer sheet 2200 on which answers has been filled in. In S6101, the user 110 sets the filled-in answer sheet 2200 on the document table 301 of the MFP. Then, the user 110 operates the operation panel 305 of the MFP 300 and presses a "score test" button 1012 on the learning test function selection screen 1010.

In S6102, the MFP 300 reads the filled-in answer sheet 2200 set on the document table 301 and generates answer data. In S6103, the MFP 300 transmits a scoring request to the learning management server 400 based on the generated answer data 5307 and receives the token character string 5318 corresponding to the scoring request as a response (see FIGS. 13A and 13B). In S6104, the learning management server 400 executes scoring processing based on the answer data 5307 received in the scoring request 5000d.

In S6105, the MFP 300 transmits the scoring result request 5000e to the learning server 400 with a token character string specified (see FIG. 14A). This drawing explains a case in which the scoring processing of the learning management server 400 has been completed at the time of S6015, and the MFP 300 receives the scoring result data 5419 as a response to the scoring result request 5000e (see FIG. 14B). If the scoring processing of the learning management server 400 has not been completed at the time of S6105, the MFP 300 repeatedly transmits the scoring result request 5000e and waits for the scoring processing of the learning management server 400 to be completed.

In S6106, the MFP 300 prints the scored answer sheet 2300 based on the scoring result data 5419 received in S6105. In S6107, the MFP 300 displays a print confirmation screen 1230 of the next unit.

In S6108, the user 110 presses a "start print" button 1232 on the print confirmation screen 1230. In S6109, the MFP 300 transmits an answer sheet request to the learning management server 400 to obtain the answer sheet 2100 of the next unit and receives the answer sheet data 5017 as a response (see FIG. 10A and FIG. 10B). In S6110, the MFP 300 prints the answer sheet 2100 of the next unit based on the received answer sheet data 5017. Thereafter, S6100 and subsequent steps may be performed repeatedly.

Configuring as described above enables the user 110 to easily print the answer sheet 2100, take a learning test, have the test scored, and proceed to the next unit by operating only the operation panel 305 of the MFP 300.

<Processing of Learning Management Server>

Next, an example of processing of each apparatus will be described. FIG. 16 is a flowchart illustrating processing details of the CPU 411 of the learning management server 400. For example, this flowchart is realized by the CPU 411 executing a control program stored in the program memory 413. Also, for example, this flowchart may be repeatedly performed by the CPU 411 at predetermined intervals.

In S4001, the CPU 411 confirms whether a web API request has been received from the MFP 300. When the CPU 411 receives a web API request, the CPU 411 proceeds to S4002; otherwise, the CPU 411 ends the flowchart. If the CPU 411 proceeds to S4002, the CPU 411 confirms the type of the web API request in each step of S4002 to S4006 and performs processing according to the type of the web API request.

In S4002, if the type of the web API request received is the test data request 5000*a*, the CPU 411 proceeds to S4007, and otherwise, the CPU 411 proceeds to S4003. In S4007, the CPU 411 obtains print data of the answer sheet 2100 for a specified unit of a specified subject using the learning content providing service 423 and transmits the print data as a web API response (S6009 in FIG. 15).

In S4003, if the type of the web API request received is the subject list request 5000*b*, the CPU 411 proceeds to S4008, and otherwise, the CPU 411 proceeds to S4004. In S4008, the CPU 411 obtains list information of subjects, which can be provided, using the learning content providing service 423 and transmits the list information as a web API response (S6001 in FIG. 15).

In S4004, if the type of the web API request received is the unit list request 5000*c*, the CPU 411 proceeds to S4009, and otherwise, the CPU 411 proceeds to S4005. In S4009, the CPU 411 obtains list information of units, which can be provided for the specified subject, using the learning content providing service 423 and transmits the list information as a web API response (S6004 in FIG. 15).

In S4005, if the type of the web API request received is the scoring request 5000*d*, the CPU 411 proceeds to S4010, and otherwise, the CPU 411 proceeds to S4006. In S4010, the CPU 411 receives the answer data that is transmitted attached to the web API request. In the following S4011, the CPU 411 generates a token for identifying the scoring request and transmits it as a web API response (S6103 in FIG. 15). Considering that actual automatic scoring processing may take processing time, the present embodiment employs a configuration in which a token is generated and transmitted as a response to the scoring request 5000*d* and a scoring result is returned according to the scoring result request 5000*e*, which will be described later. However, in cases such as when the scoring processing does not take processing time, a configuration may be taken so as to transmit the scoring result as a response to the scoring request 5000*d*.

In S4012, the CPU 411 performs automatic scoring processing for answer data using the automatic scoring service 424. In S4013, the CPU 411 stores a result of the scoring processing performed in S4012 in association with the token. The result of automatic scoring is stored in a scoring result holding buffer provided in the data memory 414 or the hard disk unit 402. At this time, by passing the result of automatic scoring to the learning state management service 422, the record can also be reflected in the account management DB 425 as performance information of a learning test taken by a corresponding user. Although the processing of S4012 to S4013 is indicated in the same flowchart here, the processing may be configured to be performed in another task that can be operated in parallel as multi-task processing. This enables the CPU 411 to return to S4001 before the end of the actual processing of S4012 and perform the next web API request reception processing.

In S4006, if the type of the web API request received is the scoring result request 5000*e*, the CPU 411 proceeds to S4014, and otherwise, the CPU 411 ends the flowchart. In S4014, the CPU 411 obtains from the scoring result holding buffer the automatic scoring result coinciding with the token specified in the web API request and transmits the result as a web API response (S6109 in FIG. 15). If the processing of S4012 to S4013 is configured to be performed in another task as described above, the automatic scoring may not be completed at the time of S4014. In such a case, by returning a status that automatic scoring is in progress in S4014 as a web API response, a web API caller side can know that the automatic scoring has not been completed.

<Processing of MFP>

(Learning Function Selection Processing)

Figure 17:
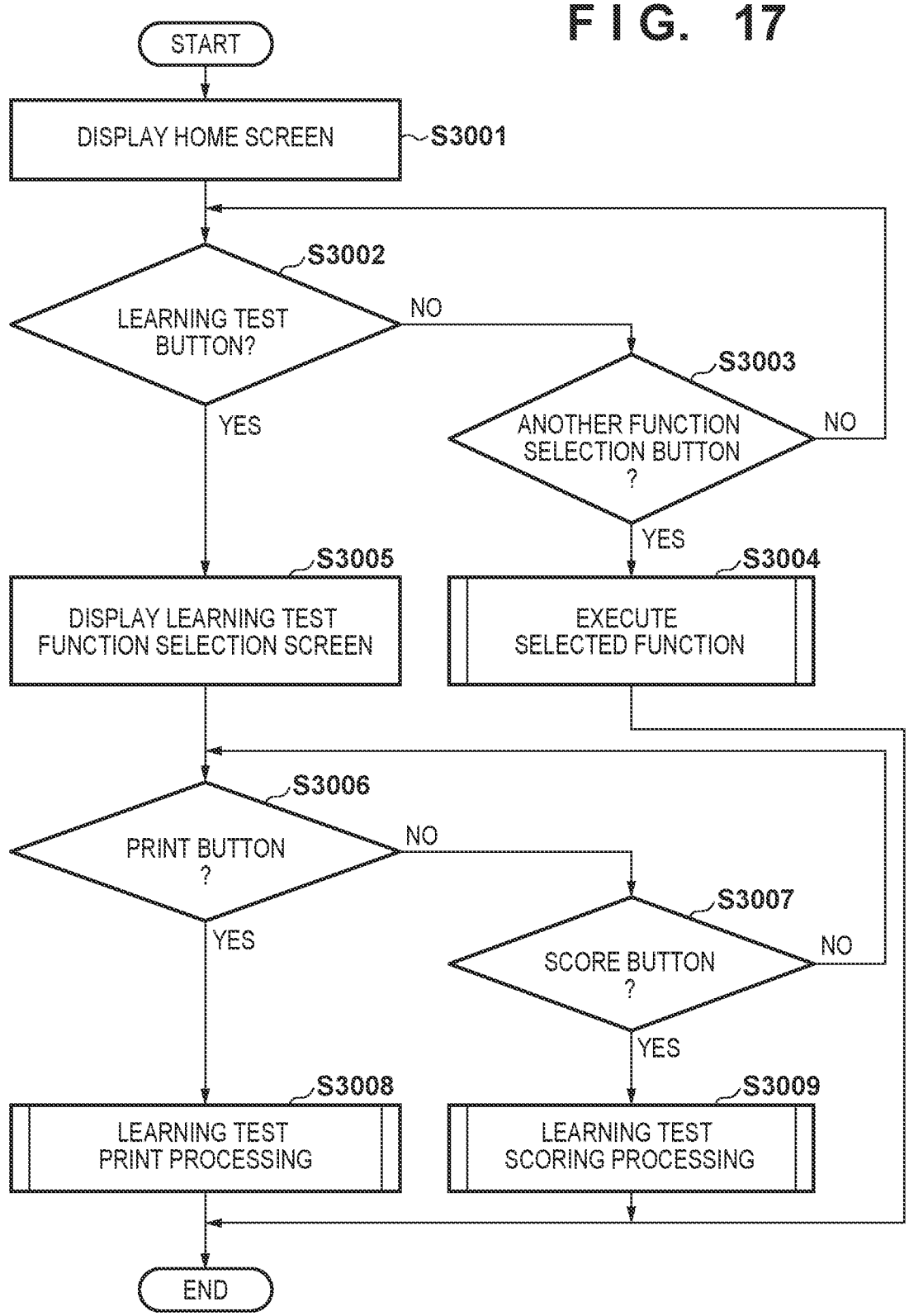
FIG. 17 is a flowchart for explaining processing details of a CPU of the MFP.

Next, an example of processing of the MFP 300 will be described. FIG. 17 is a flowchart illustrating processing details of the CPU 311 of the MFP 300. For example, this flowchart is realized by the CPU 311 executing a control program stored in the program memory 313. Further, for example, this flowchart is executed by the CPU 311 after power of the MFP 300 has been turned on and an initialization operation has been completed.

In S3001, the CPU 311 displays a home screen 1000 for receiving a function selection instruction from the user. In the following S3002 and S3003, the CPU 311 confirms whether function selection buttons 1001 to 1003 provided on the home screen 1000 have been pressed. In S3002, if the CPU 311 confirms that the "learning test" button 1003 has been pressed, the CPU 311 proceeds to S3005, and otherwise the CPU 311 proceeds to S3003. In S3003, if the CPU 311 confirms that another function selection button 1001 or 1002 or the like has been pressed, the CPU 311 proceeds to S3004 and executes a function corresponding to the pressed button. Here, descriptions for details of functions other than the learning test will be omitted. Further, when a power-off is instructed, the processing of this flowchart ends.

In S3005, the CPU 311 displays the learning test function selection screen 1010 for receiving a learning test function selection instruction. In the following S3006 and S3007, the CPU 311 confirms whether operation instruction buttons 1011 and 1012 provided on the learning test function selection screen 1010 have been pressed. In S3006, if the CPU 311 confirms that the "print test" button 1011 has been pressed, the CPU 311 proceeds to S3008 and executes learning test print processing, which will be described later (see FIG. 19), and otherwise, the CPU 311 proceeds to S3007. In S3007, if the CPU 311 confirms that the "score test" button 1012 has been pressed, the CPU 311 proceeds to S3009 and executes learning test scoring processing, which will be described later (see FIG. 21A and FIG. 21B), and otherwise, the CPU 311 returns to S3006.

Figure 18A:
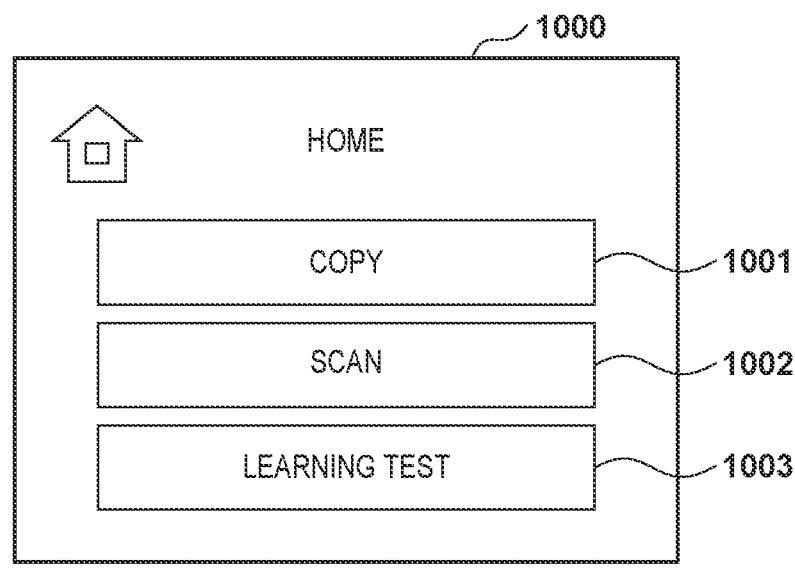
FIG. 18A is a diagram illustrating an example of a display screen of the MFP.

FIG. 18A is a diagram illustrating an example of a display screen of the MFP 300 at the time of selection of a learning test function and illustrates the home screen 1000 for receiving a function execution instruction from a user. The home screen 1000 is provided with buttons 1001, 1002, and 1003 for selecting functions to be performed. When the "copy" button 1001 is pressed, the CPU 311 controls the scanner unit 315 and the printing unit 317 to perform the copy function. When the scan button 1002 is pressed, the CPU 311 performs a scanning function for reading a document placed on the document table 301 with the scanner unit 315. When the "learning test" button 1003 is pressed, the CPU 311 selects the learning test function as indicated in the previous flowchart and displays on the operation panel 305 the learning test function selection screen 1010 for receiving a learning test function selection instruction. If there is a function that can be executed by the MFP 300 in addition to the above-described functions, a button may be added to the home screen 1000, and a configuration may be taken so as to provide a plurality of home screens and cause a function to be selected while switching the pages so as to turn a page. Further, for example, instead of immediately starting the copy operation when the copy button 1001 is pressed, a configuration may be taken so as to display a screen for setting a paper size and the number of copies, and by receiving a start operation therefrom, start the copy operation.

Figure 18B:
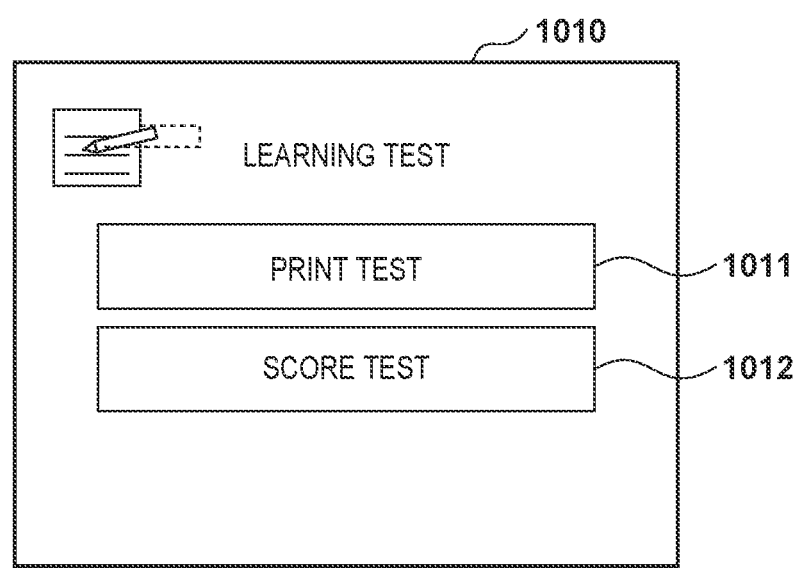
FIG. 18B is a diagram illustrating an example of a display screen of the MFP.

FIG. 18B is a diagram illustrating an example of a display screen of the MFP 300 at the time of selection of a learning test function and illustrates the learning test function selection screen 1010 for receiving a learning test function selection instruction. The learning test function selection screen 1010 is provided with buttons 1011 and 1012 for receiving an operation instruction. When the "print test" button 1011 is pressed, the CPU 311 transitions the screen to be displayed on the operation panel 305 to the subject selection screen 1100 of FIG. 20A, which will be described later. When the "score test" button 1012 is pressed, the CPU 311 transitions the screen to be displayed on the operation panel 305 to a scoring start confirmation screen 1200 of FIG. 22, which will be described later.

(Answer Sheet Print Processing)

Figure 19:
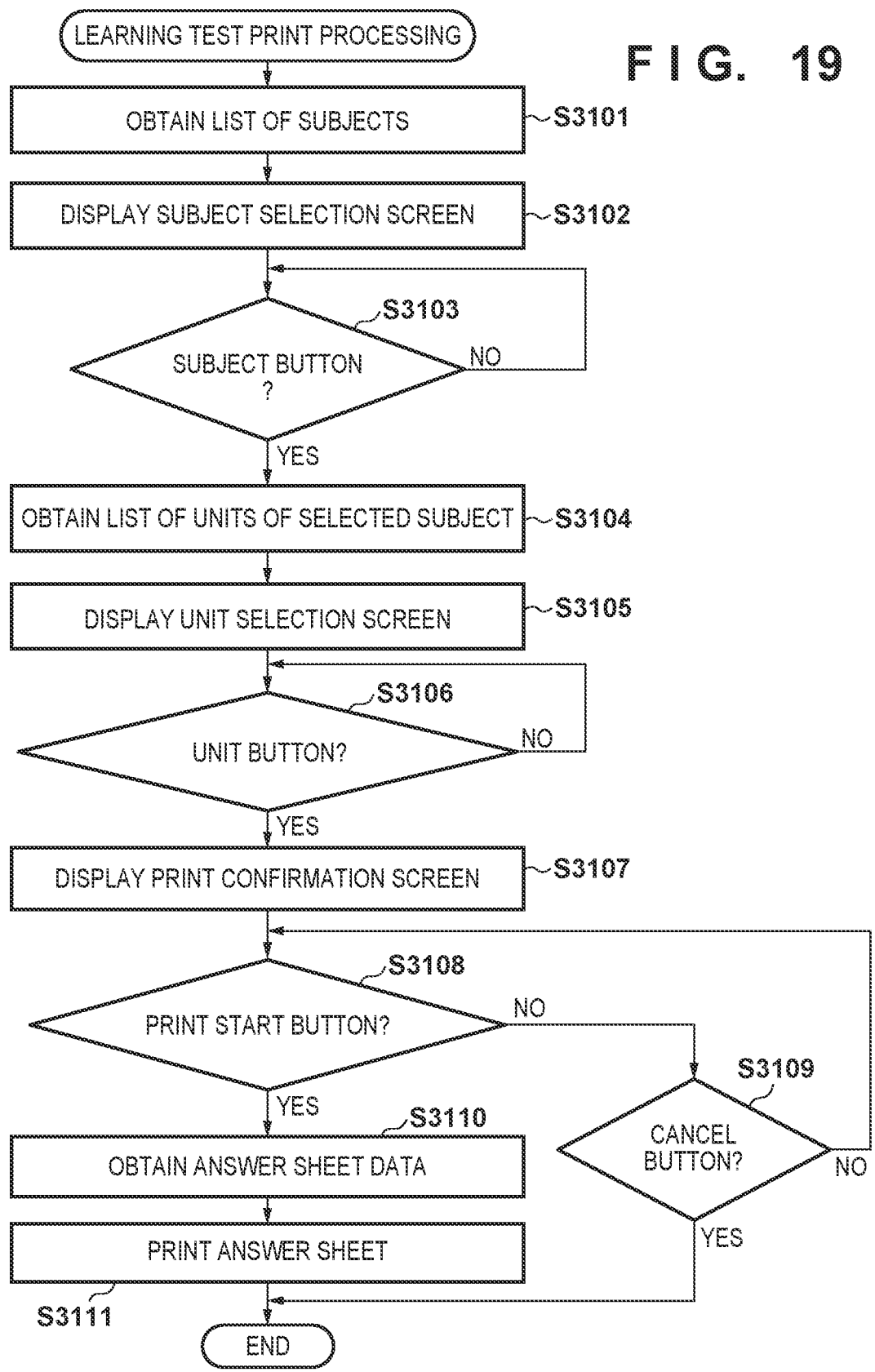
FIG. 19 is a flowchart for explaining processing details of the CPU of the MFP.

FIG. 19 is a flowchart for explaining processing details of the CPU 311 of the MFP 300 and indicates a specific example of learning test print processing executed in S3008 of FIG. 17. The processing of this drawing corresponds to the operations in S6002 to S6010 of FIG. 15.

In S3101, the CPU 311 obtains a list of subjects from the learning management server 400. This processing is realized by transmitting the subject list request 5000b and receiving a response.

In S3102, the CPU 311 displays the subject selection screen 1100 for displaying the obtained list of subjects and prompting selection. In S3103, the CPU 311 confirms whether subject selection buttons 1101 to 1103 provided on the subject selection screen 1100 have been pressed. If the CPU 311 confirms that any of the subject selection buttons 1101 to 1103 have been pressed, the CPU 311 proceeds to S3104, and otherwise, the CPU 311 repeats S3103 and waits for any of the subject selection buttons 1101 to 1103 to be pressed.

In S3104, the CPU 311 obtains a list of units of the selected subject from the learning management server 400. This processing is realized by transmitting the unit list request 5000c and receiving a response.

In S3105, the CPU 311 displays the unit selection screen 1110 for displaying the obtained list of units and prompting selection. In S3106, the CPU 311 confirms whether unit selection buttons 1111 to 1113 provided on the unit selection screen 1110 have been pressed. If the CPU 311 confirms that any of the unit selection buttons 1111 to 1113 have been pressed, the CPU 311 proceeds to S3107, and otherwise, the CPU 311 repeats S3106 and waits for any of the unit selection buttons 1111 to 1113 to be pressed.

In S3107, the CPU 311 displays the print confirmation screen 1120 to confirm whether to print the answer sheet 2100.

In S3108 and S3109, the CPU 311 confirms whether selection buttons 1122 and 1123 provided on the print confirmation screen 1120 have been pressed. In S3108, if the CPU 311 confirms that the "start print" button 1122 has been pressed, the CPU 311 proceeds to S3110, and otherwise the CPU 311 proceeds to S3109. In S3109, if a "cancel" button 1123 is pressed, the CPU 311 does not obtain answer sheet data or print the answer sheet 2100 and ends the processing, and if none of the buttons is pressed, the CPU 311 returns to S3108.

In S3110, the CPU 311 obtains answer sheet data from the learning management server 400. This processing is realized by transmitting the test data request 5000a and receiving a response. In S3111, the CPU 311 controls the printing unit 317 to print the answer sheet 2100 based on the obtained answer sheet data. In this way, the CPU 311 performs processing for printing an unfilled-in answer sheet based on answer sheet data related to an unfilled-in answer sheet obtained from the learning management server 400.

Figure 20A:
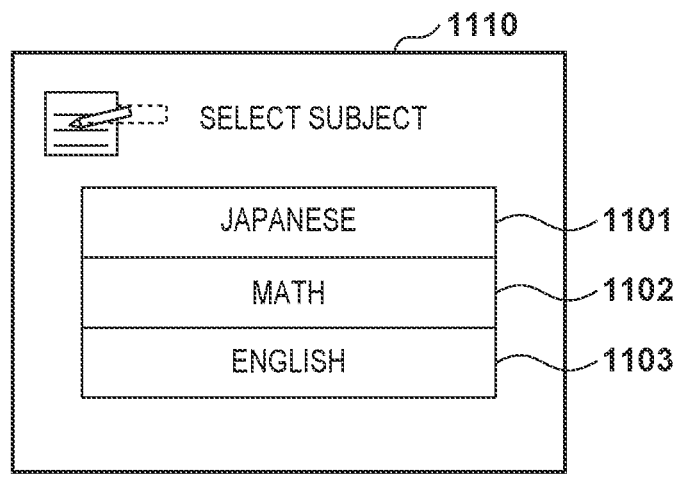
FIG. 20A is a diagram illustrating an example of a display screen of the MFP.

FIG. 20A is a diagram illustrating a display screen of the MFP 300 at the time of printing of an answer sheet 2100 and illustrates the subject selection screen 1100 for displaying a list of subjects and prompting selection. The subject selection screen 1100 is provided with buttons 1101, 1102, and 1103 for selecting a subject, each displaying a subject name. When any of the subject selection buttons is pressed, the unit selection screen 1110 for displaying a list of units for the selected subject and prompting selection is transitioned to.

Figure 20B:
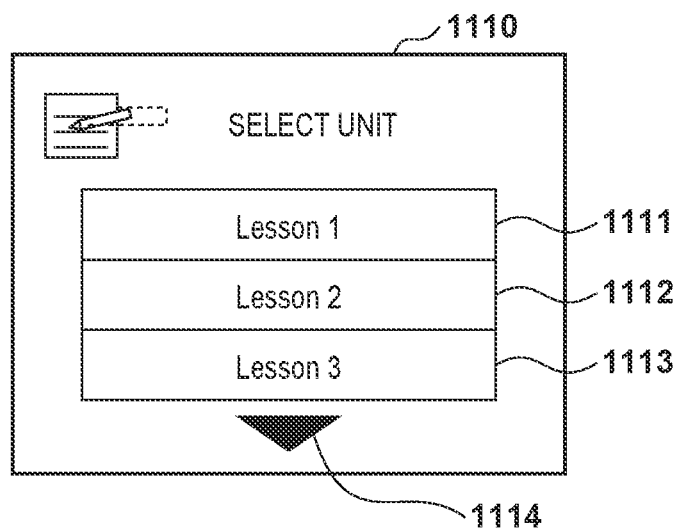
FIG. 20B is a diagram illustrating an example of a display screen of the MFP.

FIG. 20B is a diagram illustrating a display screen of the MFP 300 at the time of printing of an answer sheet 2100 and illustrates the unit selection screen 1110 for displaying a list of units for a selected subject and prompting selection. The unit selection screen 1110 is provided with buttons 1111, 1112, and 1113 for selecting a unit, each displaying a unit name. A triangular mark displayed below the unit selection buttons 1111, 1112, and 1113 is a page-forward button 1114 for moving to the next page if the unit selection buttons do not fit on one screen. When any of the unit selection buttons 1111, 1112, and 1113 is pressed, the print confirmation screen 1120 for confirming whether to print the answer sheet 2100 for a selected unit of a selected subject is transitioned to.

Figure 20C:
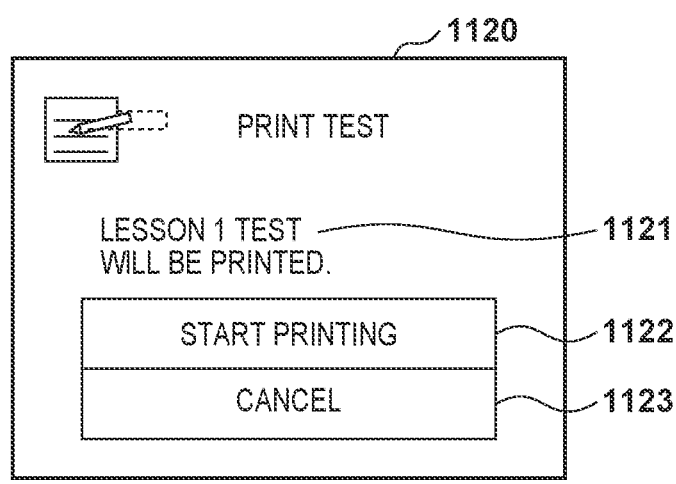
FIG. 20C is a diagram illustrating an example of a display screen of the MFP.

FIG. 20C is a diagram illustrating a display screen of the MFP 300 at the time of printing of the answer sheet 2100 and illustrates the print confirmation screen 1120 for confirming whether to print the answer sheet 2100. The print confirmation screen 1120 is provided with a message display portion 1121 for displaying information related to the answer sheet 2100 to be printed, and below that are displayed a print start button 1122 and a cancel button 1123. When the print start button 1122 is pressed, printing of the answer sheet 2100 of a selected unit of a selected subject is started. When the cancel button 1123 is pressed, the processing ends without printing of the answer sheet 2100, and the home screen 1000 is returned to.

(Processing at Time of Scoring)

Figure 21A:
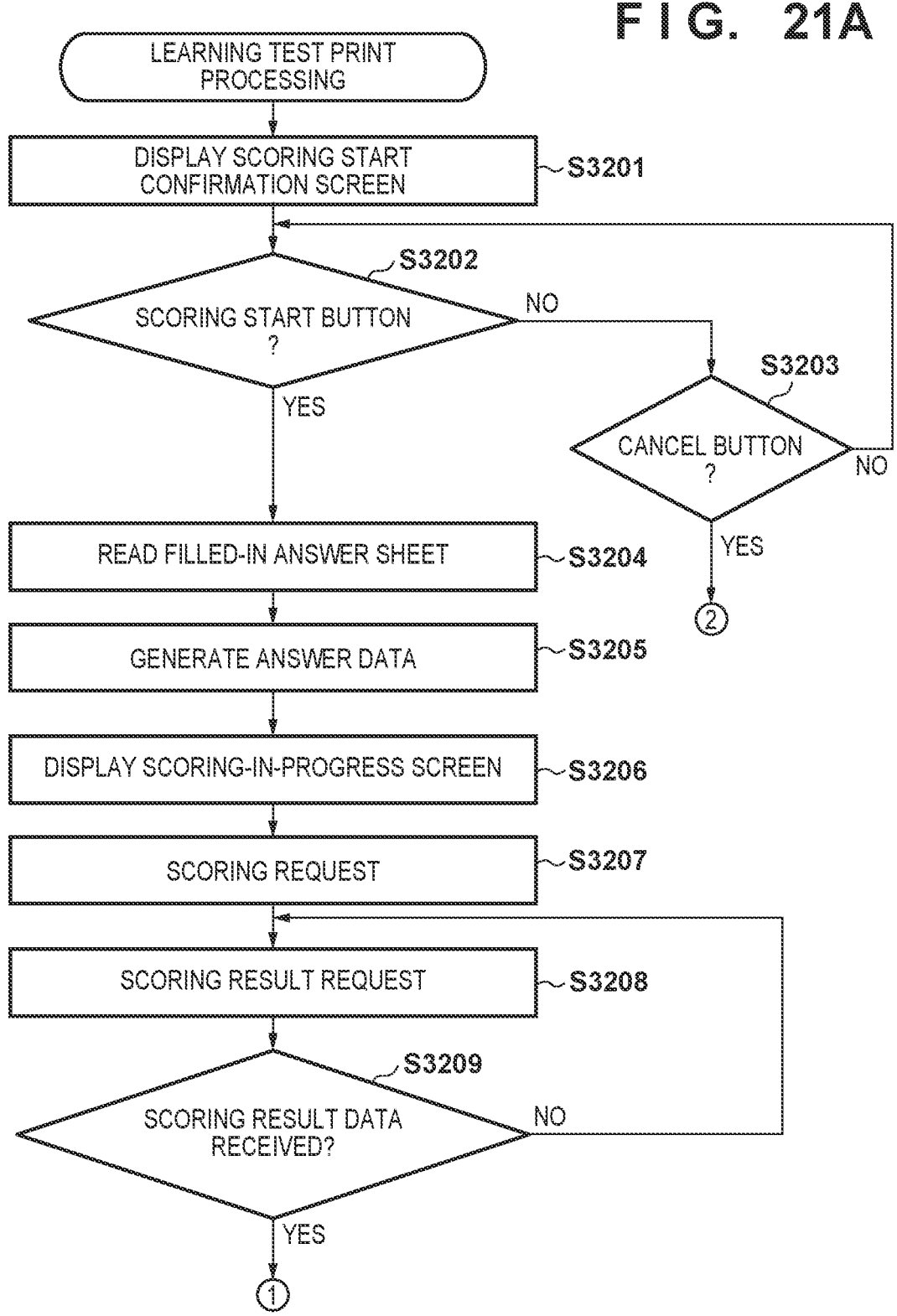
FIG. 21A is a flowchart for explaining processing details of the CPU of the MFP.
Figure 21B:
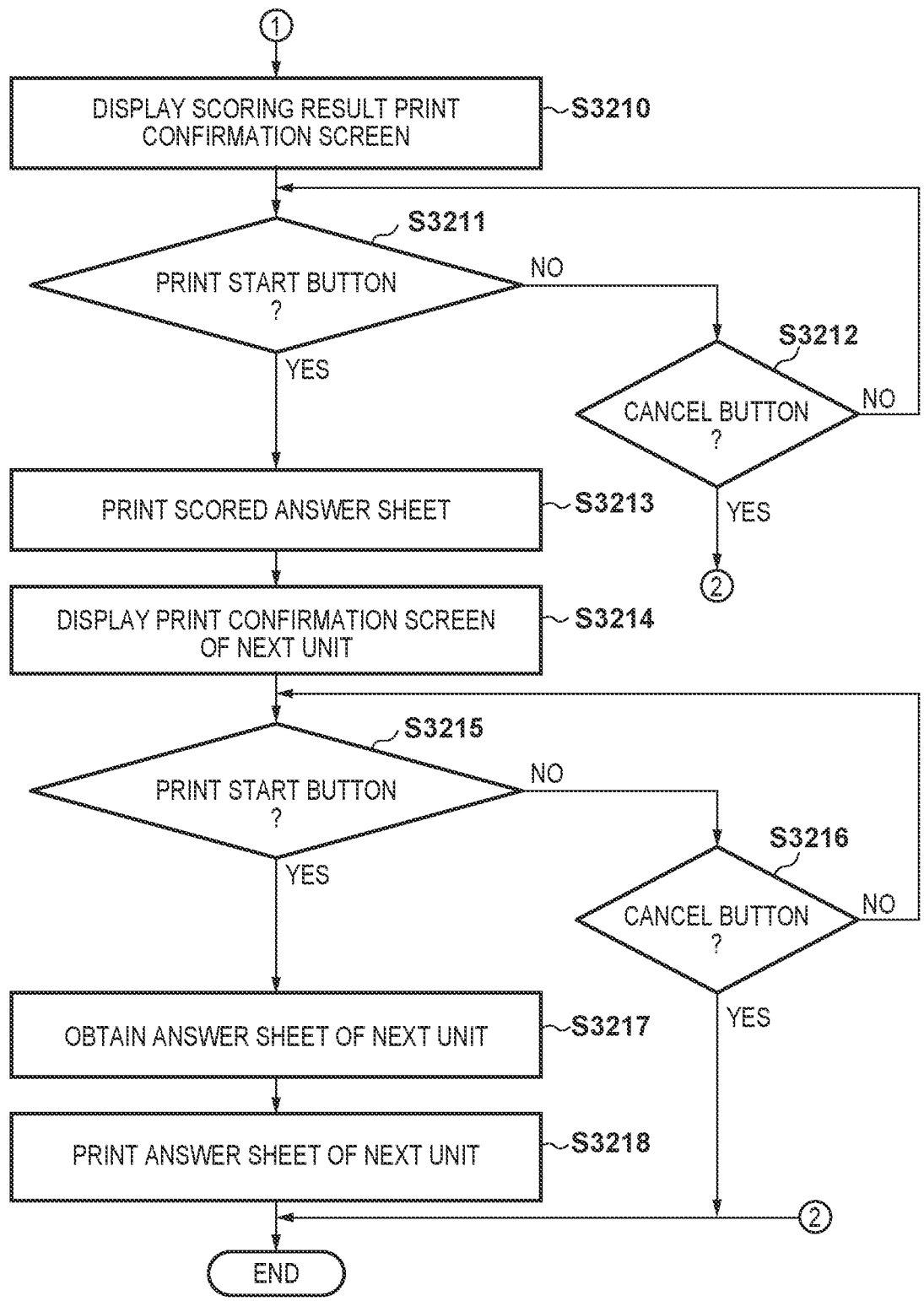
FIG. 21B is a flowchart for explaining processing details of the CPU of the MFP.

FIG. 21A and FIG. 21B is a flowchart for explaining processing details of the CPU 311 of the MFP 300 and indicates a specific example of learning test scoring processing executed in S3009. The processing of this drawing corresponds to the operations in S6101 to S6110 of FIG. 15.

In S3201, the CPU 311 displays the scoring start confirmation screen 1200 for confirming that the filled-in answer sheet 2200 has been set on the document table in order to start scoring. In S3202 and S3203, the CPU 311 confirms whether any of buttons 1202 and 1203 provided on the scoring start confirmation screen 1200 has been pressed. In S3202, if the CPU 311 confirms that the "start scoring" button 1202 has been pressed, the CPU 311 proceeds to S3204, and otherwise the CPU 311 proceeds to S3203. In S3203, if the CPU 311 confirms that the "cancel" button 1203 has been pressed, the CPU 311 ends the flowchart, and otherwise, the CPU 311 returns to S3202.

In S3204, the CPU 311 controls the scanner unit 315 to read the filled-in answer sheet 2200 set on the document table. In S3205, the CPU 311 generates, from an image obtained by reading the filled-in answer sheet 2200, answer data for transmission of the scoring request 5000d. The data structure of the scoring request 5000d is as described above. In S3206, the CPU 311 displays a scoring-in-progress screen 1210 for notifying that the scoring processing is in progress on the operation panel 305. In S3207, the CPU 311 transmits the scoring request 5000d to the learning management server 400.

In S3208 and S3209, the CPU 311 waits to receive a scoring result from the learning management server 400. Specifically, in S3208, the CPU 311 transmits the scoring result request 5000e. Then, in S3209, the CPU 311 confirms the response, and if the CPU 311 has received a scoring result response including scoring result data, the CPU 311 proceeds to S3210, and otherwise, the CPU 311 returns to S3208 and repeats this until it receives a scoring result response. Then, in S3210, the CPU 311 causes the operation panel 305 to display a scoring result print confirmation screen 1220 for confirming whether to print the scored answer sheet 2300.

In S3211 and S3212, the CPU 311 confirms whether selection buttons 1222 and 1223 provided on the scoring result print confirmation screen 1220 have been pressed. In S3211, if the CPU 311 confirms that the "start print" button 1222 has been pressed, the CPU 311 proceeds to S3213, and otherwise the CPU 311 proceeds to S3212. In S3212, if the CPU 311 confirms that the "cancel" button 1223 has been pressed, the CPU 311 ends the flowchart, and otherwise, the CPU 311 returns to S3211.

In S3213, the CPU 311 controls the printing unit 317 to print the scored answer sheet 2300 based on the received scoring result data. In S3214, the CPU 311 causes the operation panel 305 to display a next unit test print confirmation screen 1230 for confirming whether to perform a learning test of the next unit.

In S3215 and S3216, the CPU 311 confirms whether any of buttons 1231 and 1232 provided on the next unit test print confirmation screen 1230 has been pressed. Specifically, in S3215, if the CPU 311 confirms that the "start print" button 1231 has been pressed, the CPU 311 proceeds to S3217, and otherwise the CPU 311 proceeds to S3216. In S3216, if the CPU 311 confirms that the "cancel" button 1232 has been pressed, the CPU 311 ends the flowchart, and otherwise, the CPU 311 returns to S3215.

In S3217, the CPU 311 obtains data of the answer sheet 2100 of the next unit from the learning management server 400. This processing is realized by transmitting a web API request for an answer sheet request and receiving a response. In the following S3218, the CPU 311 controls the printing unit 317 to print the answer sheet 2100 of the next unit based on the obtained answer sheet data.

A method for specifying an answer sheet of the next unit in S3217 includes storing in the data memory 314 or the like a subject and a unit of the answer sheet 2100 that was last obtained and, based on the stored contents, specifying the answer sheet 2100 of the next unit from a list of units of a corresponding subject. Further, the next unit for which printing is to be performed does not necessarily have to be of the same subject, and a configuration may be taken so as to perform a plurality of subjects in order. Meanwhile, when it is detected that the "cancel" buttons 1203, 1212, 1223, and 1233 in the respective screens have been pressed, the subsequent processing is stopped, and the test scoring processing is terminated.

Figure 22A:
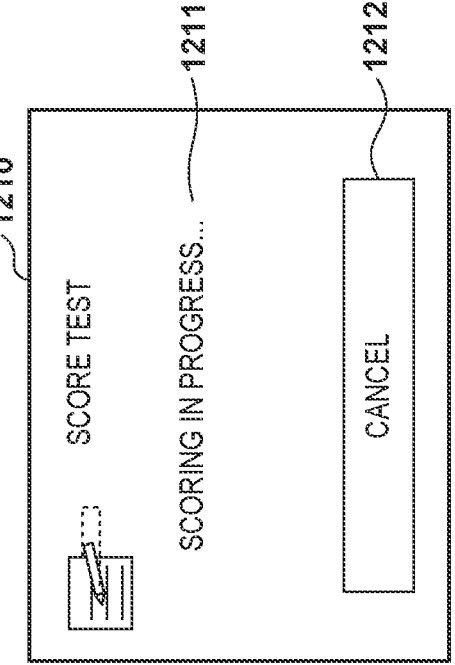
FIG. 22A is a diagram illustrating an example of a display screen of the MFP.

FIG. 22A is a diagram illustrating a display screen of the MFP 300 at the time of test scoring and illustrates the scoring start confirmation screen 1200 for confirming that the filled-in answer sheet 2200 is set on the document table in order to start scoring. On the scoring start confirmation screen 1200 is provided a message portion 1201 for displaying information instructing to set the filled-in answer sheet 2200 on the document table, and below that are provided a scoring start button 1202 and a cancel button 1203. When the scoring start button 1202 is pressed, reading of the filled-in answer sheet 2200 set on the document table starts. When the cancel button 1203 is pressed, the CPU 311 ends the processing and returns the display of the operation panel 305 to the home screen 1000.

Figure 22B:
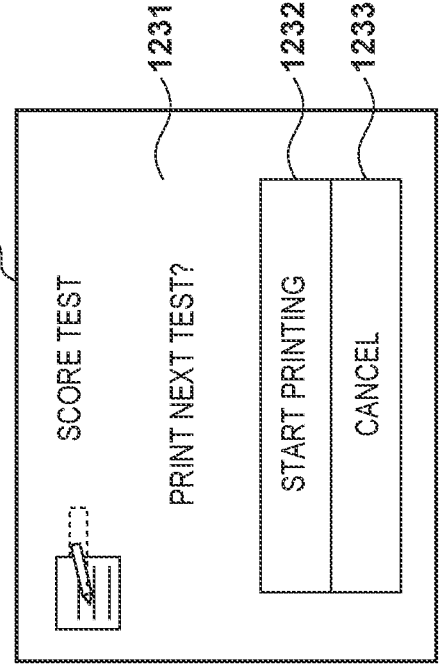
FIG. 22B is a diagram illustrating an example of a display screen of the MFP.

FIG. 22B is a diagram illustrating a display screen of the MFP 300 at the time of test scoring and illustrates the scoring-in-progress screen 1210 for notifying that scoring processing is in progress. On the scoring-in-progress screen 1210 is provided a message portion 1211 for displaying information related to an execution state of the scoring processing, and below that is provided the cancel button 1212. When the cancel button 1212 is pressed, the CPU 311 ends the scoring processing and returns the display screen of the operation panel 305 to the home screen 1000.

Figure 22C:
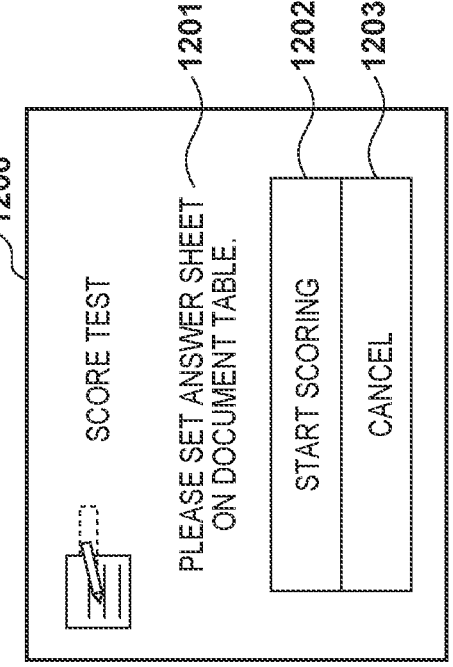
FIG. 22C is a diagram illustrating an example of a display screen of the MFP.

FIG. 22C is a diagram illustrating a display screen of the MFP 300 at the time of test scoring and illustrates the scoring result print confirmation screen 1220 for confirming whether to print the scored answer sheet 2300. On the scoring result print confirmation screen 1220 is provided a message portion 1221 for displaying information indicating that printing of the scored answer sheet 2300 will be started, and below that are provided the print start button 1222 and the cancel button 1223. When the print start button 1222 is pressed, the CPU 311 controls the printing unit 317 to start printing the scored answer sheet 2300. When the cancel button 1223 is pressed, the CPU 311 ends the processing and returns the display of the operation panel 305 to the home screen 1000.

Figure 22D:
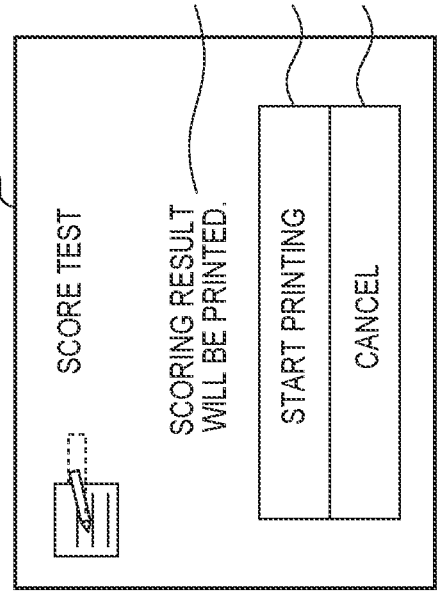
FIG. 22D is a diagram illustrating an example of a display screen of the MFP.

FIG. 22D is a diagram illustrating a display screen of the MFP 300 at the time of test scoring and illustrates the next unit test print confirmation screen 1230 for confirming whether to perform a learning test of the next unit. On the next unit test print confirmation screen 1230 is provided a message portion 1231 for displaying information indicating that printing of the answer sheet 2100 of the next unit will be started, and below that are provided the print start button 1232 and the cancel button 1233. When the print start button 1232 is pressed, the CPU 311 controls the printing unit 317 to start printing the answer sheet 2100 of the next unit. When the cancel button 1233 is pressed, the CPU 311 ends the processing and returns the operation panel 305 to the home screen 1000.

As described above, according to the present embodiment, the CPU 311 transmits data related to the filled-in answer sheet 2200 read by the scanner unit 315 to the learning management server 400 via the wireless LAN unit 318. The CPU 311 also receives data related to a correctness of an answer filled in on the filled-in answer sheet 2200 from the learning management server 400 via the wireless LAN unit 318. Then, the CPU 311 controls the printing unit 317 to print a scoring result of the answer based on the received data related to the correctness. This enables an easy confirmation of a scoring result in a system for scoring tests performed on paper.

Further, in the present embodiment, the CPU 311 transmits, as data related to the filled-in answer sheet 2200, answer data related to the answer filled in on the filled-in answer sheet 2200. The CPU 311 also receives, as data related to the correctness of the answer, scoring data related to a scoring result of the answer. This enables the MFP 300 to output, based on a result of scoring processing performed by the learning management server 400, the scoring result as paper.

Further, according to the present embodiment, since an operation on the user side only becomes an operation on the MFP 300, even if the user is a minor, for example, it is easy for the minor themself to transmit an answer sheet to a server after performing a test and reference a result. In addition, there is no need to go through a teacher or a guardian in a duration from after performing a test until obtaining a scoring result and advancing to the next step, thereby enabling the minor to learn without losing motivation for learning due to going through a teacher or a guardian being troublesome or taking time.

In addition, despite the recent advances in IT utilization in educational institutions, the demand for workbooks, tests, and the like printed on paper will not immediately be eliminated. For example, there are concerns for a prolonged use of IT terminal electronic devices by minors, such as worsening vision, and there are voices of opposition from educators and guardians. In addition, since it is required that answers be filled in on a paper test at a test site for an admission test, there is a strong demand for paper tests as preparation for admission tests. In response to such a demand, since scoring results of a test performed on paper can easily be confirmed in the present embodiment, performing of tests on paper can be facilitated.

The CPU 311 may transmit data on the type of the filled-in answer sheet 2200, specifically the subject and unit, as data related to the filled-in answer sheet 2200 to the learning management server 400 via the wireless LAN unit 318. That is, data related to the filled-in answer sheet 2200 transmitted from the MFP 300 to the learning management server 400 may include contents of the answer filled in on the filled-in answer sheet 2200 or may indicate the type of the filled-in answer sheet 2200 itself. The CPU 311 may then receive correct answer data for a correct answer of a question corresponding to the filled-in answer sheet 2200 as data for a correctness of the answer. That is, data related to the correctness of the answer transmitted from the MFP 300 to the learning management server 400 may be data related to a determination (scoring result) of the correctness of the answer filled in on the filled-in answer sheet 2200 or may be data indicating a correct answer of the question corresponding to the filled-in answer sheet 2200. Scoring may be executed on the MFP 300 side based on image data of the filled-in answer sheet 2200 and the correct answer data received from the learning management server 400.

Second Embodiment

A second embodiment differs from the first embodiment in processing for when the next answer sheet 2100 is printed after printing the scored answer sheet 2300. Specifically, in the present embodiment, the CPU 311 determines whether to print the answer sheet 2100 of the next unit or print the answer sheet 2100 of the same unit again according to the scoring result. Hereinafter, the same configuration as that of the first embodiment are assigned the same reference numerals and descriptions thereof may be omitted.

FIG. 23A is a diagram illustrating a data structure of a scoring result request 5000f, which is an example of an API request. Since the data structure of the scoring result request 5000f illustrated here is the same as the data structure of the scoring result request 5000e illustrated in FIG. 14A, a description thereof will be omitted.

FIG. 23B is a diagram illustrating a data structure of an API response 5010f for the scoring result request 5000f. The following parameter has been added to the status header 5012 in the data structure of the API response 5010e illustrated in FIG. 14B. A "score" describes a total score 5501 obtained as a scoring result. With this parameter, the MFP 300 can know the total score of 5501 obtained as a scoring result as a concrete numerical value.

Figure 24A:
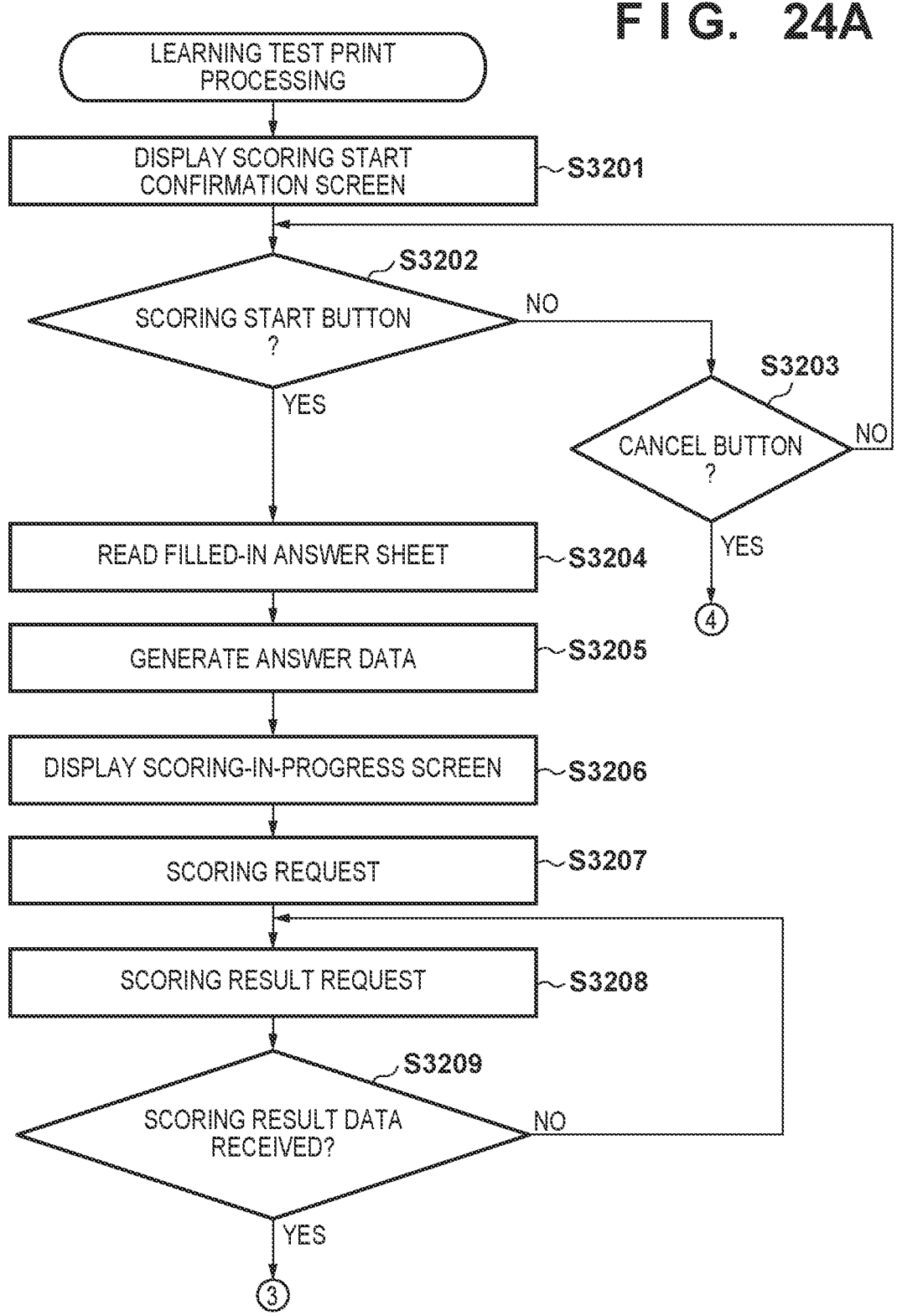
FIG. 24A is a flowchart for explaining processing details of the CPU of the MFP.
Figure 24B:
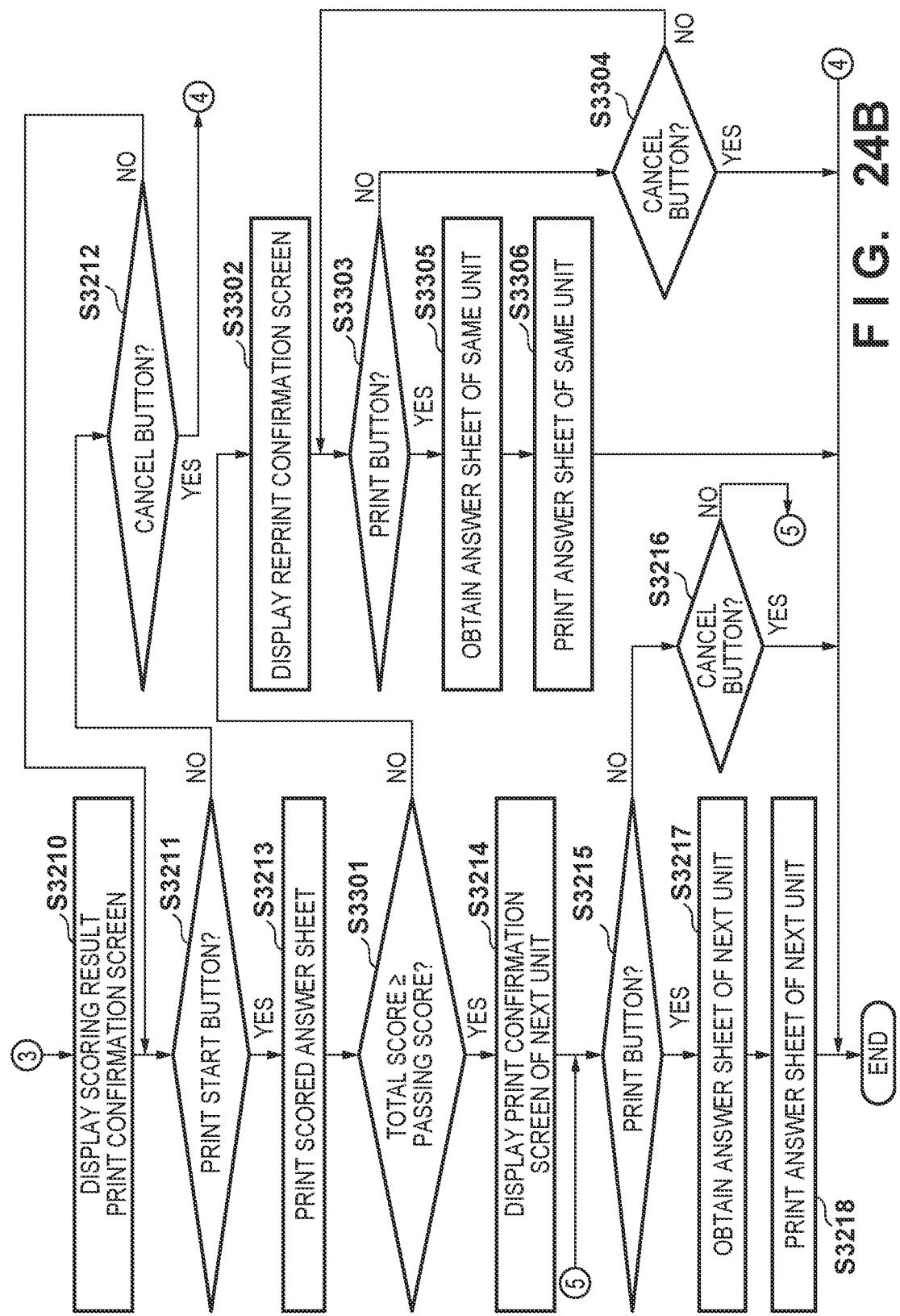
FIG. 24B is a flowchart for explaining processing details of the CPU of the MFP.

FIG. 24A and FIG. 24B is a flowchart for explaining processing details of the CPU 311 of the MFP 300 and indicates a specific example of learning test scoring processing executed in S3009. Hereinafter, differences from the learning test scoring processing in the first embodiment illustrated in FIG. 21A and FIG. 21B will be mainly described. Since processing details of S3201 to S3213 are the same as those of S3201 to S3213 of FIG. 21A and FIG. 21B, descriptions thereof will be omitted. When printing of the scored answer sheet 2300 is completed in S3213, the CPU 311 proceeds to the added S3301.

In S3301, the CPU 311 obtains the total score 5501 obtained as a scoring result from the "score" parameter passed in the API response 5010 for obtaining a scoring result and determines whether or not the score is equal to or greater than a passing score. The passing score is determined in advance as a predetermined score, and the CPU 311 determines, for example, 60 points or more as passing. In S3301, if the total score 5501 is equal to or higher than the passing score, the CPU 311 advances to S3214, and thereafter, the answer sheet 2100 of the next unit is printed by processing of S3214 to S3218 in the same manner as in the flowchart of FIG. 21A and FIG. 21B. In S3301, if the total score 5501 is less than the passing score, the CPU 311 proceeds to S3302.

In S3302, the CPU 311 causes the operation panel 305 to display a reprint confirmation screen 1300 for confirming whether to perform a learning test of the same unit again. In S3303 and S3304, the CPU 311 confirms whether any of buttons 1331 and 1332 provided on the reprint confirmation screen 1300 has been pressed. In S3303, if the CPU 311 confirms that the "start print" button 1331 has been pressed, the CPU 311 proceeds to S3305, and otherwise the CPU 311 proceeds to S3304. In S3304, if the CPU 311 confirms that the "cancel" button 1332 has been pressed, the CPU 311 stops the subsequent processing, and otherwise, the CPU 311 ends the test scoring processing.

In S3305, the CPU 311 obtains data of the answer sheet 2100 of the same unit from the learning management server 400. This processing is realized by the CPU 311 transmitting a web API request for an answer sheet request and receiving a response from the learning management server 400. In S3306, the CPU 311 controls the printing unit 317 to print the answer sheet 2100 of the same unit based on the obtained answer sheet data. Here, it is assumed that, in order to obtain the answer sheet 2100 of the unit that is the same as the previous one, the CPU 311 stores in the data memory 314 or the like the subject and the unit of the answer sheet 2100 that was last obtained. Then, based on the stored information, the CPU 311 transmits a web API request of the answer sheet request in S3305.

Figure 25:
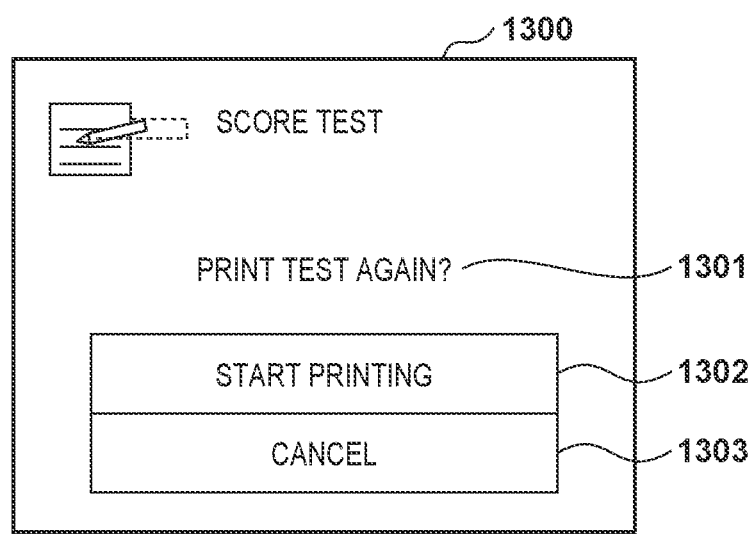
FIG. 25 is a diagram illustrating an example of a display screen of the MFP.

FIG. 25 is a diagram illustrating a display screen of the MFP 300 at the time of confirming a reprint and illustrates the reprint confirmation screen 1300 for confirming whether to perform a learning test of the same unit again. On the reprint confirmation screen 1300 is provided a message portion 1301 for displaying information indicating that a reprint of the answer sheet 2100 of the same unit will be started, and below that are provided a print start button 1302 and a cancel button 1303. When the print start button 1302 is pressed, a reprint of the answer sheet 2100 of the same unit is started. When the cancel button 1303 is pressed, the process ends and the home screen 1000 is returned to.

As described above, the CPU 311 prints by the printing unit 317 an unfilled-in answer sheet in accordance with the scoring result of the previous test. Specifically, if a scoring result satisfies a predetermined condition, such as when the score of a test is equal to or higher than a passing score, the CPU 311 prints the answer sheet 2100 of a question that differs from a question corresponding an answer that has been scored. On the other hand, if a scoring result does not satisfy the predetermined condition, such as when the score of a test is less than the passing score, the CPU 311 prints the answer sheet 2100 of a question that corresponds to an answer that has been scored. Thus, the user 110 can proceed to the next unit or perform the learning test of the same unit again depending on the total score of the learning test that has been performed. This will enable the user to learn in accordance with their learning proficiency. In the present embodiment, learning that accords with one's learning proficiency can be provided simply with an operation of the MFP 300; therefore, even a minor can easily learn in accordance with their learning proficiency.

In the above description, a passing score is determined in advance as a predetermined score; however, the passing score may vary depending on another reference. For example, a passing score may be set for each subject or unit, and it may be determined whether to print the answer sheet of the next unit or the answer sheet of the same unit depending on different passing scores. In addition, a configuration may be taken so as to vary the passing score in accordance with differences between the MFPs 300 or the users 110 that perform a learning test even if the subject or unit is the same. Furthermore, a configuration may also be taken so as to vary the passing score each time even when the same user 110 performs the same subject or unit. In this case, by the passing score being managed on a database on the learning management server 400 side and being passed to the MFP 300 as an API response for obtaining an answer sheet or as a parameter of an API response for obtaining a scoring result, the MFP 300 can determine the passing score.

Third Embodiment

A third embodiment differs from the second embodiment in a configuration in which the learning management server 400 side determines and controls whether the answer sheet 2100 of the next unit is printed or the answer sheet 2100 of the same unit is printed again.

FIG. 26A is a diagram illustrating a data structure of a scoring result request 5000g, which is an example of an API request. Since the data structure of the scoring result request 5000g illustrated here is the same as that of the scoring result request 5000e illustrated in FIG. 14A, a detailed description thereof will be omitted.

FIG. 26B is a diagram illustrating a data structure of an API response 5010g for the scoring result request 5000g. The following parameter has been added to the status header 5012 in the data structure of the API response 5010e illustrated in FIG. 14B. A "nextsubject" describes a character string specifying the subject of the answer sheet 2100 to be printed next after printing the scored answer sheet 2300. A "nextunit" describes a character string specifying the unit of the answer sheet 2100 to be printed next after printing the scored answer sheet 2300. With these parameters, the MFP 300 can recognize the subject and unit of the answer sheet 2100 to be printed next after printing the scored answer sheet 2300.

Since the processing flow of the CPU 411 of the learning management server 400 in the present embodiment is the same as that of the flowchart illustrated in FIG. 16, an illustration will be omitted; however, the following points are different in the processing of S4014 indicated in the flowchart of FIG. 16. In S4014, the CPU 411 obtains from the scoring result holding buffer the automatic scoring result coinciding with the token specified in the scoring result request 5000g and transmits the result as an API response. At this time, contents to be described in "nextsubject" and "nextunit", which are parameters of an API response, is determined in accordance with whether the total score in a scoring result is equal to or greater than a predetermined passing score. For example, that if the total score is greater than or equal to the predetermined passing score, the CPU 411 determines a description content of the parameters of an API response such that the answer sheet 2100 of the next unit will be printed. For example, that if the total score is less than the passing score, the CPU 411 determines a description content of the parameters of an API response such that the same answer sheet 2100 will be reprinted.

Since the processing flow of the CPU 311 of the MFP 300 at the time of scoring a test in the present embodiment is the same as that of the flowchart illustrated in FIG. 21A and FIG. 21B, an illustration will be omitted; however, the following points are different in the processing of S3217 indicated in the flowchart of FIG. 21A and FIG. 21B. In the first embodiment, the subject and unit of the last obtained answer sheet 2100 are stored, and the answer sheet 2100 of the next unit is obtained. On the other hand, in the present embodiment, information of a subject 5601 to be printed next and a unit 5602 to be printed next need only be obtained from "nextsubject" and "nextunit", which are parameters passed as an API response to the scoring result request 5000g.

As described above, according to the present embodiment, the next learning content is determined on the system 100 side in accordance with the user's proficiency, and the MFP 300 prints the corresponding answer sheet 2100. Thus, the user can learn in accordance with their proficiency.

Other Embodiments

In the above-described embodiments, after the user selects the subject and the unit, the MFP 300 obtains the answer sheet data 2012 of the specified unit content 2010 and prints the answer sheet 2100. As another embodiment, the MFP 300 may be configured to obtain the question sheet data 2011 included in the unit content 2010 that is the same as that of the answer sheet data 2012 to be printed and print the question sheet together with the answer sheet 2100. At this time in a case where the CPU 311 determines whether to print the answer sheet 2100 of the next unit or print the answer sheet 2100 of the same unit again according to the total score as in the second embodiment, a configuration may be taken so as to determine whether or not to also print the question sheet. That is, when printing the answer sheet 2100 of the same unit again, the question sheet does not need to be printed because the user already has it. Therefore, a configuration may be taken such that when the CPU 311 prints the answer sheet 2100 of the next unit, the CPU 311 also prints the question sheet of the next unit, but when the CPU 311 prints the answer sheet 2100 of the same unit again, the CPU 311 does not print the question sheet. This makes it possible not to unnecessary print question sheets.

In the second and third embodiments, descriptions have been given for cases where it is determined whether to print the answer sheet 2100 of the next unit or print the answer sheet 2100 of the same unit again according to the total score; however, a configuration may be taken so as to make a determination using a condition other than the total score. For example, a selection screen may be displayed on the operation panel 305 to prompt the user 110 to select whether to print the answer sheet 2100 of the next unit or print the answer sheet 2100 of the same unit again. That is, a configuration may be taken so as to receive on the operation panel 305 the type of unfilled-in answer sheet to be printed.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-182057, filed Nov. 8, 2021, which is hereby incorporated by reference herein in its entirety.

What is claimed is:

1. A multifunction peripheral comprising:
    at least one memory and at least one processor which cause the multifunction peripheral to:
    control a scanner to read a filled-in answer sheet on which an answer has been filled in;
    transmit, to a server, data related to the filled-in answer sheet read by the scanner;
    receive, from the server, data related to a correctness of the answer that has been filled in on the filled-in answer sheet;
    control a printer to print a scoring result of the answer based on the data related to the correctness of the answer that has been received;
    in a case where the scoring result satisfies a predetermined condition,
        acquire, from the server, answer sheet data related to an unfilled-in answer sheet of a question different from a question corresponding to the answer that has been scored; and
        control the printer to print the unfilled-in answer sheet of the question different from the question corresponding to the answer that has been scored based on the acquired answer sheet data; and
    in a case where the scoring result does not satisfy the predetermined condition,
        acquire, from the server, answer sheet data related to an unfilled-in answer sheet of the question corresponding to the answer that has been scored; and
        control the printer to print the unfilled-in answer sheet of the question that corresponds to the answer that has been scored based on the acquired answer sheet data.

2. The multifunction peripheral according to claim 1, wherein
    the data related to the filled-in answer sheet is answer data related to the answer that has been filled in on the filled-in answer sheet, and
    the data related to the correctness of the answer is scoring data related to the scoring result of the answer.

3. The multifunction peripheral according to claim 2, wherein the at least one memory and the at least one processor further cause the multifunction peripheral to:
    transmit the answer data and request the server to execute scoring of the answer; and
    after requesting the server to execute scoring of the answer, receive the scoring result from the server.

4. The multifunction peripheral according to claim 2, wherein the at least one memory and the at least one processor further cause the multifunction peripheral to:
    request the server to execute scoring of the answer;
    after requesting the server to execute scoring of the answer, request the server to provide the scoring result; and
    receive the scoring result from the server as a result of the request the server to provide the scoring result.

5. The multifunction peripheral according to claim 1, wherein the at least one memory and the at least one processor further cause the multifunction peripheral to:
    in a case where the scoring result satisfies the predetermined condition,
        display a screen for confirming whether to print the unfilled-in answer sheet of the question different from the question corresponding to the answer that has been scored; and
        acquire, from the server, the answer sheet data related to the unfilled-in answer sheet of the question different from the question corresponding to the answer that has been scored, based on a user operation to start printing performed on the screen.

6. The multifunction peripheral according to claim 1, wherein the at least one memory and the at least one processor further cause the multifunction peripheral to:

in a case where the unfilled-in answer sheet of the question different from the question corresponding to the answer that has been scored is printed by controlling the printer, also control the printer to print a question sheet that corresponds to the unfilled-in answer sheet to be printed; and in a case where the unfilled-in answer sheet of the question that corresponding to the answer that has been scored is printed by controlling the printer, also control the printer to print a question sheet that corresponds to the unfilled-in answer sheet to be printed.

7. The multifunction peripheral according to claim 1, wherein the at least one memory and the at least one processor further cause the multifunction peripheral to:
   in a case where the unfilled-in answer sheet of the question that is different from the question that corresponds to the answer that has been scored is printed by controlling the printer, control the printer to print a question sheet that corresponds to the unfilled-in answer sheet to be printed; and
   in a case where the unfilled-in answer sheet of the question that corresponds to the answer that has been scored is printed by controlling the printer, control the printer not to print the question sheet that corresponds to the unfilled-in answer sheet to be printed.

8. The multifunction peripheral according to claim 1, wherein
   the data related to the filled-in answer sheet is data related to a type of the filled-in answer sheet, and
   the data related to the correctness of the answer is correct answer data related to a correct answer of a question that corresponds to the filled-in answer sheet.

9. The multifunction peripheral according to claim 8, wherein
   the data related to the filled-in answer sheet includes image data of the filled-in answer sheet read by the scanner; and
   wherein the at least one memory and the at least one processor further cause the multifunction peripheral to;
   score the answer based on the image data of the filled-in answer sheet and the correct answer data.

10. The multifunction peripheral according to claim 1, wherein
    the predetermined condition is satisfied when the scoring result is equal to or higher than a passing score, and
    the predetermined condition is not satisfied when the scoring result is less than the passing score.

11. The multifunction peripheral according to claim 1, wherein the at least one memory and the at least one processor further cause the multifunction peripheral to:
    determine whether the scoring result satisfies the predetermined condition after the scoring result has been printed.

12. The multifunction peripheral according to claim 1, wherein the at least one memory and the at least one processor further cause the multifunction peripheral to:
    in a case where the scoring result does not satisfy the predetermined condition,
       display a screen for confirming whether to print the unfilled-in answer sheet of the question corresponding to the scored answer that has been scored; and
       acquire, from the server, the answer sheet data related to the unfilled-in answer sheet of the question corresponding to the scored answer that has been scored, based on a user operation to start printing performed on the screen.

13. A server that is capable of communicating with a multifunction peripheral including a scanner configured to read a document and a printer configured to print an image, the server comprising:
    at least one memory and at least one processor which cause the server to:
    receive, from the multifunction peripheral, data related to a filled-in answer sheet read by the scanner;
    transmit, to the multifunction peripheral, data related to a correctness of an answer that has been filled in on the filled-in answer sheet
    in a case where a scoring result of the answer based on the data related to the correctness of the answer satisfies a predetermined condition,
       provide, to the multifunction peripheral, answer sheet data related to an unfilled-in answer sheet of a question different from a question corresponding to the answer that has been scored; and
    in a case where the scoring result does not satisfy the predetermined condition,
       provide, to the multifunction peripheral, answer sheet data related to an unfilled-in answer sheet of the question corresponding to the answer that has been scored.

14. The server according to claim 13, wherein
    the data related to the filled-in answer sheet that has been received is answer data related to the answer that has been filled in on the filled-in answer sheet, and
    wherein the at least one memory and the at least one processor further cause the server to:
    score the answer based on the answer data; and
    transmit, to the multifunction peripheral, the data related to the scoring result as the data related to a correctness of the answer that has been filled in on the filled-in answer sheet.

15. A system including a multifunction peripheral and a server,
    the multifunction peripheral comprising:
    at least one memory and at least one processor which cause the multifunction peripheral to:
    control a scanner to read a filled-in answer sheet on which an answer has been filled in;
    transmit, to the server, data related to the filled-in answer sheet read by the scanner;
    receive, from the server, data related to a correctness of the answer that has been filled in on the filled-in answer sheet;
    control a printer to print a scoring result of the answer, based on the data related to the correctness of the answer that has been received;
    in a case where the scoring result satisfies a predetermined condition,
       acquire, from the server, answer sheet data related to an unfilled-in answer sheet of a question different from a question corresponding to the answer that has been scored; and
       control the printer to print the unfilled-in answer sheet of the question different from the question corresponding to the answer that has been scored based on the acquired answer sheet data; and
    in a case where the scoring result does not satisfy the predetermined condition,
       acquire, from the server, answer sheet data related to an unfilled-in answer sheet of the question corresponding to the answer that has been scored; and control the printer to print the unfilled-in answer sheet of the question that corresponds to the answer that has been scored based on the acquired answer sheet data; and the server comprising:

at least one memory and at least one processor which cause the server to:

receive, from the multifunction peripheral, the data related to the filled-in answer sheet read by the scanner;

transmit, to the multifunction peripheral, the data related to the correctness of the answer that has been filled in on the filled-in answer sheet;

in a case where the scoring result satisfies a predetermined condition,
provide, to the multifunction peripheral, the answer sheet data related to the unfilled-in answer sheet of the question different from the question corresponding to the answer that has been scored; and in a case where the scoring result does not satisfy the predetermined condition,
provide, to the multifunction peripheral, the answer sheet data related to the unfilled-in answer sheet of the question corresponding to the answer that has been scored.

16. The system according to claim 15, wherein the data related to the filled-in answer sheet is answer data related to the answer that has been filled in on the filled-in answer sheet, and the data related to the correctness of the answer is scoring data related to the scoring result of the answer.

* * * * *